US012734927B2

(12) United States Patent
Lee et al.

(10) Patent No.: US 12,734,927 B2
(45) Date of Patent: Sep. 15, 2026

(54) ELECTRIC VEHICLE FLEET AND CHARGING INFRASTRUCTURE MANAGEMENT

(71) Applicant: PowerFlex Systems, LLC, San Diego, CA (US)

(72) Inventors: Zachary Jordan Lee, Altadena, CA (US); John Horn, San Diego, CA (US)

(73) Assignee: PowerFlex Systems, LLC, San Diego, CA (US)

( * ) Notice: Subject to any disclaimer, the term of this patent is extended or adjusted under 35 U.S.C. 154(b) by 27 days.

(21) Appl. No.: 18/356,615

(22) Filed: Jul. 21, 2023

(65) Prior Publication Data

US 2024/0157837 A1 May 16, 2024

Related U.S. Application Data

(60) Provisional application No. 63/423,230, filed on Nov. 7, 2022.

(51) Int. Cl.
*B60L 53/65* (2019.01)
*B60L 53/67* (2019.01)
(Continued)

(52) U.S. Cl.
CPC ............... *B60L 53/65* (2019.02); *B60L 53/67* (2019.02); *G06Q 10/02* (2013.01); *B60L 53/68* (2019.02); *G06Q 50/06* (2013.01)

(58) Field of Classification Search
CPC ........... B60L 53/10; B60L 53/65; B60L 53/67
See application file for complete search history.

(56) References Cited

U.S. PATENT DOCUMENTS 10,981,464 B1 * 4/2021 Sun ......................... B60L 53/51
2012/0056583 A1 * 3/2012 Gotz ....................... B60L 53/14
320/109

(Continued)

FOREIGN PATENT DOCUMENTS

EP 3806007 A1 * 4/2021 ........... G06N 3/0442
WO WO-2024078728 A1 * 4/2024 .............. B60L 53/63

OTHER PUBLICATIONS

Keijsper, "Modelling of LP-problems (2WO09)" Technische Universiteit Eindhoven, 2009, https://jkeijspe.win.tue.nl/onderwijs/2WO09/slides.pdf (Year: 2009).*

(Continued)

*Primary Examiner* — Jessica Lemieux
*Assistant Examiner* — Matthew Parker Goodman
(74) *Attorney, Agent, or Firm* — Dinsmore & Shohl LLP

(57) ABSTRACT

Certain aspects of the present disclosure provide techniques for to managing electric vehicle fleets and management of charging infrastructure to support the electrical vehicle fleets. An example method for electric vehicle fleet management includes determining that an electric vehicle is in route to a charging site including a plurality of charging stations. The method also includes assigning a charging task to the electric vehicle and assigning the electric vehicle to one of the plurality of charging stations based on one or more vehicle characteristics, one or more operation targets of the charging task, and one or more characteristics of the plurality of charging stations. The method includes, in response to determining that the electric vehicle has plugged into the assigned charging station, associating the electric vehicle with a charging session and allocating charging power to the assigned charging station.

19 Claims, 10 Drawing Sheets

(51) Int. Cl.

| | |
|---|---|
| ***B60L 53/68*** | (2019.01) |
| ***G06Q 10/02*** | (2012.01) |
| ***G06Q 50/06*** | (2024.01) |

(56) References Cited

U.S. PATENT DOCUMENTS

2013/0024035 A1* 1/2013 Ito ........................... B60L 53/51
700/291
2015/0202975 A1* 7/2015 Solomon .......... G06Q 10/06316
705/7.26
2019/0087753 A1* 3/2019 Ito .......................... G06Q 50/40
2019/0184850 A1* 6/2019 Lee ......................... B60L 53/66
2019/0263271 A1* 8/2019 Ashby .................... G06Q 40/04
2019/0285425 A1* 9/2019 Ludwick ............ G06Q 10/0631
2019/0383637 A1* 12/2019 Teske ................. G01C 21/3676
2020/0254896 A1* 8/2020 Lee ......................... B60L 53/68
2021/0197685 A1* 7/2021 Soon ....................... H02J 50/40
2021/0200240 A1* 7/2021 Ware ....................... B60L 53/36
2023/0050192 A1* 2/2023 Quirynen ............. G08G 1/0112
2023/0113696 A1* 4/2023 Bahramirad ............ H02J 3/381
307/43
2023/0286408 A1* 9/2023 Kinsey .................... B60L 53/66

OTHER PUBLICATIONS

Chang, "Convex Relaxation for Mixed-Integer Optimal Power Flow Problems" Fifty-Fifth Annual Allerton Conference, Allerton House, UIUC, Illinois, USA, Oct. 3-6, 2017, https://ieeexplore.ieee.org/document/8262753 (Year: 2017).*

EV Charging Summit Blog, "Level 1, 2, and 3 Charging—The Three Types of Electric Vehicle Chargers" Nov. 14, 2022, https://evchargingsummit.com/blog/three-types-of-electric-vehicle-chargers/ (Year: 2022).*

* cited by examiner

ELECTRIC VEHICLE FLEET AND CHARGING INFRASTRUCTURE MANAGEMENT

CROSS REFERENCE

This application claims the benefit of the U.S. Provisional Application Ser. No. 63/423,230, filed on Nov. 7, 2022, which is hereby incorporated by reference in its entirety.

INTRODUCTION

Aspects of the present disclosure relate to management of electric vehicle fleets and management of charging infrastructure to support the electrical vehicle fleets.

Electric vehicles (EVs), including plug-in hybrid and fully electric vehicles, are increasing in popularity around the world. It is expected that the proportion of new EVs sold each year out of the total number of vehicles sold will continue to rise for the foreseeable future. Moreover, while EV operators are primarily non-commercial at present (e.g., personal vehicles), commercial vehicle operators are increasingly adding EVs to their fleets for all sorts of commercial operations, thus adding to the number of EVs in operation throughout the world.

Management of fleets of electric vehicles and the charging infrastructure to support the fleets is challenging because of, in part, varying capabilities in electric vehicles within the fleet (e.g., battery capacity, battery recharge capability, range, on-board charging equipment compatibilities, etc.) and varying capabilities and availability of electric vehicle supply equipment (EVSE). For example, different EVSE may have different levels (e.g., how much electric power can be delivered to the vehicle) and different plug-in interfaces. One challenge for fleet owners is assigning vehicles to tasks that require, for example, the vehicle to be able to travel a certain mileage. While this challenge exists for both vehicle fleets of internal combustion engine (ICE)-powered vehicles as well as fleets of plug-in electric vehicles, the unique technological challenges inherent to plug-in electric fleets increase the difficulty of managing a fleet. For example, ICE-powered vehicles can refuel relatively quickly and can have a relatively long range. Recharging plug-in electric vehicles can be measured in hours and depends on what type of EVSE the vehicle is compatible with and whether a fast recharging EVSE is available. Replacing ICE-powered vehicle fleets with plug-in electric vehicle fleets has beneficial environmental impact. However, these technical problems inherent in plug-in electric vehicle technology limit the ability of plug-in electric vehicle fleets to replace ICE-powered vehicle fleets. As such, there is a need to overcome these challenges to manage electric vehicle fleets and charging infrastructure to support the electrical vehicle fleets so that adoption and use of environmentally beneficial EV vehicles can be accelerated.

SUMMARY

Certain embodiments provide a method for electric vehicle fleet management. The method includes determining that an electric vehicle is in route to a charging site including a plurality of charging stations. The method also includes assigning a charging task to the electric vehicle and assigning the electric vehicle to one of the plurality of charging stations based on one or more vehicle characteristics, one or more operation targets of the charging task, and one or more characteristics of the plurality of charging stations. The method includes, in response to determining that the electric vehicle has plugged into the assigned charging station, associating the electric vehicle with a charging session and allocating charging power to the assigned charging station.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
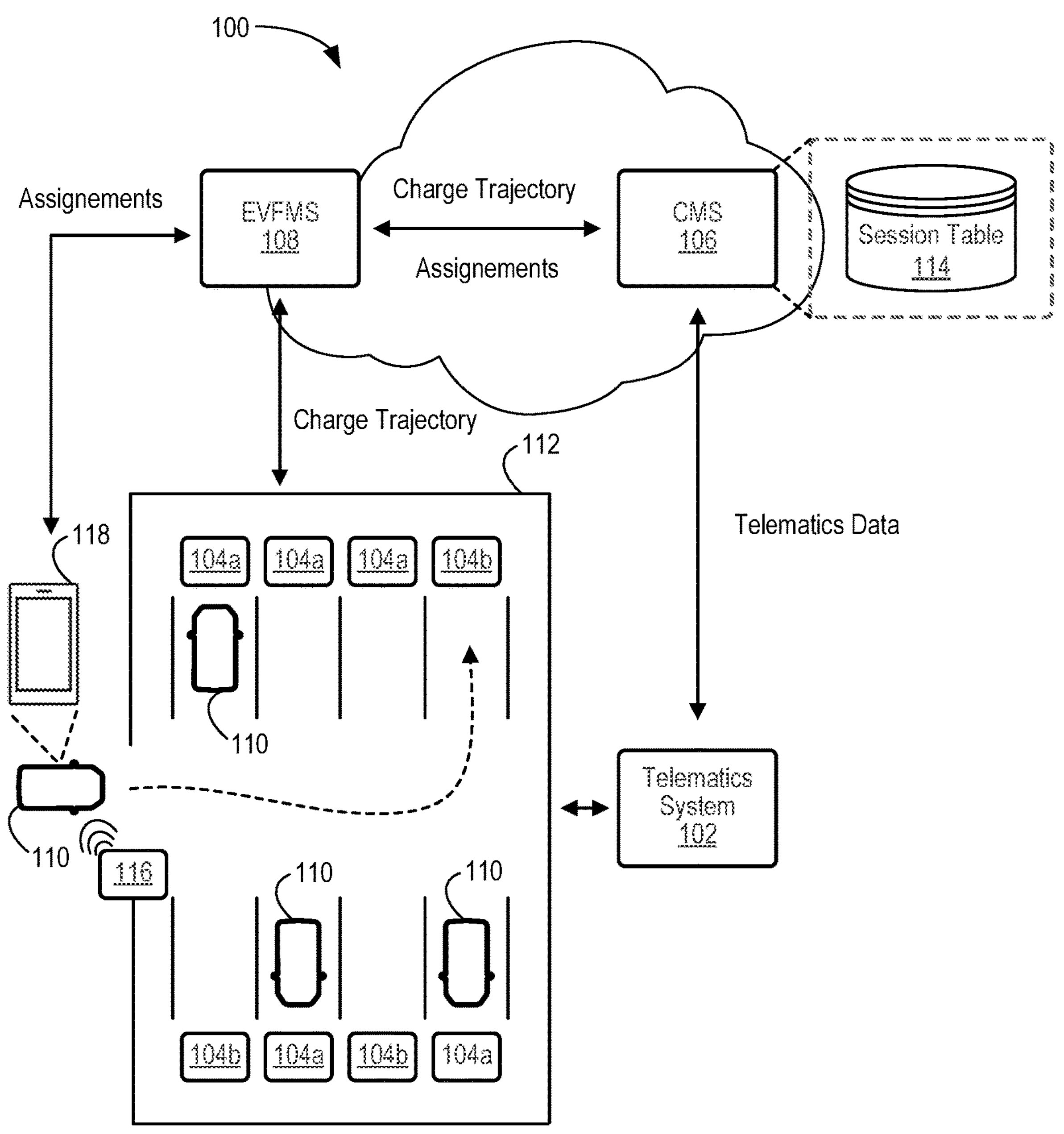
FIG. 1 depicts an example session management system that manages a fleet of electric vehicles and charging stations.

Aspects of the present disclosure provide apparatuses, methods, processing systems, and computer-readable mediums for management of electric vehicle fleets and management of charging infrastructure to support the electrical vehicle fleets.

Managing a fleet of electric vehicles is challenging due to the technical limitations inherent in electric vehicle technology. One challenge is recharging time. Internal combustion engine (ICE) vehicles can refuel in a timeframe measured in minutes. However, electric vehicles recharge in a timeframe measured sometimes in hours. This makes managing a fleet of electric vehicles technologically different than managing a fleet of ICE vehicles. Fleet management generally includes assigning jobs to vehicles and electric vehicle supply equipment (EVSE) (sometimes referred to herein as "charging stations") to recharge the vehicles such that they are capability of performing the assigned job at the requested time. For example, a job may be a delivery route or a car rental period, etc. where the electric vehicle needs to have a minimum range (e.g., a minimum SoC to support a range) by a deadline (e.g., the start of the rental period, the start of the delivery route) with a certain capacity (e.g., capacity for four passengers, cargo capacity of twenty cubic feet, etc.).

Another challenge of managing a fleet of electric vehicles is determining which charging station at a charging site will satisfy the charging task associated with the job assigned to the electric vehicle. Because the electric vehicle fleet may be composed of vehicles of different makes and models, management of the fleet has to account for different vehicle attributes that are relevant both to job assignment and charging tasks that support those job assignments. Similarly, charging stations may have different power levels that affect a maximum charging rate and different connectors to accommodate the different makes and models. For example, while most vehicles in the United States are compatible with the J1772 standard for level-2 AC charging, vehicles may only be compatible with a Combined Charging System (CCS) connector or a "CHArge de MOve" (CHAdeMO) connector for level-3 DC charging. In addition, the parking stalls near the charging stations may have geometric constraints that limit which vehicles can charge at them, i.e., size of the parking space or length of the charging cord. Additionally, because some charging sites have limited power availability, the fleet management system for a fleet of electric vehicles may have to consider congestion in the charging network. For example, the charging site may not have enough power available to charge all electric vehicles as a high charging rate even if enough high level charging stations are available.

The problem of matching electric vehicles to jobs or electric vehicles to charging stations may be considered bipartite matching problems. While polynomial time algorithms exist for solving bipartite matching problems, these require knowing a priori the cost of each matching and that these costs are independent. However, the costs of matching are linked (e.g., via the charging management), so standard techniques for bipartite matching do not readily apply. Similarly, the problem of jointly matching vehicles, jobs, and charging stations is a multidimensional matching problem, which is NP-Hard, meaning it is difficult to solve for large problem instances even if the variables are independent and the contribution of each variable is known. This also means that a solution to this matching problem cannot be practically performed in the human mind, even with a physical aid. Additionally, matching electric vehicles to jobs and to charging stations includes uncertainty. For example, jobs may be added at any time, such as a walk-in customer seeking to use an EV in a rental fleet for an immediate job. Additionally, the arrival time and state of charge of vehicles when they arrive introduces further uncertainty, making the problem even more complex, and thus impractical for solving manually (e.g., by the human mind).

A fleet for electric vehicles may be managed to match electric vehicles in the fleet with jobs and match electric vehicle to charging station based on vehicle characteristics (e.g., vehicle physical attributes, current SoC, etc.), operational targets of the task (e.g., the necessary vehicle attributes and the charging task, etc.), and/or characteristics of the charging stations (maximum recharge rate, connector type, parking space attributes, etc.). A job may be associated with a reservation and/or time at with the vehicle is to be used. Descriptively, a job may be associated with a task, such as delivering cargo or being a car rental reservation. A job is also associated with technical requirements to perform the task. As used herein, a job, in part, defines a charging task (e.g., a deadline and a minimum state of charge (SoC), etc.), necessary vehicle attributes (e.g., tow capacity, passenger capacity, size of cargo area, etc.), and/or power availability to recharge the electric vehicle. The deadline is when the job is scheduled to occur. The electric vehicle assigned to the job is to have at least the minimum state of charge before this deadline. The required vehicle attributes limit the electric vehicles that could be assigned to this job. For example, a job (e.g., a job defined for a car rental agency) may specify the necessary vehicle attributes include a specific class of electric vehicle (e.g., a luxury electric sedan) and the charging task include requirements of an availability at 6:00 pm with at least 80% state of charge. As another example, a job (e.g., for a last-mile delivery fleet) may specify the necessary vehicle attributes as (i) at least 10 ft. of cargo clearance, (ii) at least 800 $ft^3$ of cargo space, and (iii) 10,000 lbs. of cargo capacity and the charging task to be available 6:30 am with at least 80 miles of range.

As described herein, an electric vehicle fleet management system (EVFMS) solves the bipartite matching problem and matches electric vehicles to jobs and charging stations automatically as the electric vehicle arrives at the charging site. The methods and system described herein overcome the technical problems inherent in the technology of electric vehicles to facilitate determining which vehicle is most suitable for a given job by considering vehicle characteristics and charging capabilities automatically. This may, for example, improve vehicle uptime, charging cost, vehicle utilization, etc. Accordingly, aspects described herein represent technical solutions to the technical problems associated with management of fleets of electric vehicles, as described above and herein.

Example Fleet Management System Data Flow

FIG. 1 depicts an example system 100 that performs electric vehicle fleet and charging infrastructure management. The system 100 includes a telematics system 102, charging stations 104*a* and 104*b* (collectively "charging stations 104"), a charging management system (CMS) 106, and an electric vehicle fleet management system (EVFMS) 108.

The telematics system 102 communicatively couples to telematics systems of vehicles 110 that are configured to use the charging stations 104 managed by the CMS 106 and/or EVFMS 108. For example, the processing unit and/or infotainment unit of the vehicle 110 may operate an application that connects the telematics control unit of the vehicle 110 to the telematics system 102 through a wireless connection (e.g., a wireless local area network, a cellular data network, a wide area network, etc.). In some examples, the vehicle 110 may include a separate electronic control unit (sometimes referred to as a "telematics control unit") to collected telematics data from the vehicle 110 and communicatively couple to the telematics system 102. The telematics system 102 collects telematics data from the vehicle 110 that includes, for example, data related to the state of the battery of the vehicle 110 (e.g., plugin state, charging rate, and/or state of charge, etc.) and data related to the operation of the vehicle 110 (e.g., location data, occupant data, diagnostic data, mileage, planned trips, etc.). In some examples, the telematics data collected by the telematics system 102 includes the pilot signal received from the charging station 104. The vehicle 110 may be manual (motive functions of the vehicle 110 are controlled by a driver), semi-autonomous (e.g., some routine motive functions, such as parking, controlled by the vehicle 110) or autonomous (e.g., motive functions are controlled by the vehicle 110 without direct driver input).

The charging stations 104 are communicatively coupled to the CMS 106 by wired or wireless connections. In some examples, the charging stations 104 are wirelessly connected (e.g., via a wireless local area network connection, such as Wi-Fi®, a personal area network connection, such as Bluetooth®, or a mesh network connection, such as ZigBee®, etc.) to a local connection point or server. The local connection point or server may then be connected though a wired network or a wireless network (e.g., a cellular network, a wide area network etc.) to the CMS 106 and/or the EVFMS 108. The charging stations 104 interface with the vehicle 110 (e.g., via a plug) and provide power to recharge the battery of the vehicle 110. The charging stations 104 provide a pilot signal that affects the operation of the vehicle 110. For example, the pilot signal communicates to the vehicle 110 the maximum current that the vehicle 110 can draw from the charging station 104. Because the pilot signal sets a maximum current that the vehicle 110 is able to draw, it limits the amount of current that is available to recharge the battery of the vehicle 110. Thus, as more or less maximum current is available, the vehicle 110 reacts by, for example, increasing and decreasing the recharge rate of the battery.

In the illustrated example, the charging stations 104 are organized into charging sites 112. The charging sites 112 include multiple charging stations 104 that share access to resources (e.g., power, parking spaces, etc.) and are controlled by the CMS 106. Often, the charging stations 104 at sites have different capabilities and/or connection types to facilitate charging vehicles of different makes and models. For example, the charging sites 112 may include low-level charging stations 104*a* that have relatively lower power levels (e.g., Level 1 as set forth in Society of Automotive Engineers (SAE) Standard J1772-2017) and high-level charging stations 104*b* that have relatively higher power levels (e.g., Level 2 and/or Level 3 as set forth in SAE J1772). While, for simplicity of illustration, the charging stations have been defined into two categories (e.g., low-level charging stations 104*a* and high-level charging stations 104*b*), there may be more categories or delineations of charging stations 104. For example, the charging stations 104 may distinguished and categorized based on various characteristic, such as (i) levels (e.g., as set forth in SAE J1772), (ii) maximum power (e.g., 1.9 kilowatts (kW), 6.6 kW, 19.2 kW, etc.), (iii) the current type (e.g. alternating current (AC), direct current (DC)), (iv) connector types (e.g., a SAE J1772-compliant connector, a CSS connector, a CHAdeMO connector, etc.), (v) cord length, (vi) parking space attributes (e.g., sized for compact vehicles, standard vehicles, or cargo vehicles, accessible parking spaces, etc.), and/or (vii) charging stations 104 that are reserved for a particular purpose or department, etc. The power resources at the charging sites 112 may be limited. For example, the power generation at or available to the charging sites 112 may be limited (e.g., using off-grid power generation) or may be, from time-to-time, subject to restriction (e.g., curtailment). In such examples, there may not be enough power available to the charging sites 112 to charge all vehicle 110 recharging at the charging sites 112 to be recharging to their maximum charge rate or recharge using one of the high-level charging stations 104*b* even if available.

The CMS 106 manages charging sessions and manages power utilization by the charging stations 104. The CMS 106 may control multiple charging stations 104 in a geographic area to provide charging to the vehicles 110 and balancing power capacity of the location by, for example, defining pilot signals among multiple vehicles 110 charging at the location to shape the power utilization. For each vehicle 110, the CMS 106 defines a charging trajectory that includes one or more charging rates over time based on (i) operation targets of s charging task assigned to the vehicle 110, charging limits of the vehicle 110, and charging limits of an assigned charging station 104. The CMS 106 creates and manages these charging trajectories while performing load management between the charging stations 104 to stay below an electrical limit of the charging site 112. The CMS 106 tracks charge sessions generated by a vehicle 110 plugging into a charging station 104 in the charging network managed by the CMS 106. In the illustrated example, the CMS 106 includes a session table 114 that stores the charging sessions with the charging station 104 and a station identifier use at the charging station for the charging session. The session table 114 may be a lookup table, a database, or any other data structure to store the charging sessions in association with an identifier of the charging station 104 and the station identifier encoded into the pilot signal during the charge session.

When a vehicle 110 plugs into one of the charging stations 104, the charging station 104 sends a message to the CMS 106. The CMS 106 calculates a station identifier as a sequence of one or more pilot signals and sends the station identifier to the charging station 104. The CMS 106 may determine the station identifier before the vehicle 110 plugs into the charging station 104 or in response to the vehicle 110 plugging into the charging station 104. The charging station 104 communicates the station identifier by communicating the sequence of one or more pilot signals to the vehicle 110. In some examples, the CMS 106 generates the sequence of pilot signals as an ordered set of changes to the duty cycle of the pilot signal that change at specified intervals. The pilot signal with the encoded station identifier causes the vehicle 110 to adjust its charging rate to stay at or below the charging rate as specified by the sequence of one or more pilot signals. The CMS 106 decodes the station identifier which was encoded in the pilot signal based on the effects to the operation of the vehicle 110 (e.g., in this case charging rate) as recorded by the telematics unit of the vehicle 110 and as retrieved or otherwise received by the telematics system 102.

The vehicle 110 may not have a reliable connection to a network to facilitate communication with the telematics system 102 while the vehicle 110 is charging. For example, the charging stations 104 may be in a parking garage where the vehicle 110 does not receive reliable cellular service. In some examples, the telematics system 102 retrieves the telematics data from the period that the vehicle 110 was plugged into the charging station when the vehicle 110 reestablishes a suitable connection. In such examples, prior, unclaimed charging session may be associated with the vehicle 110 after the connection is reestablished.

The EVFMS 108 monitors and manages a fleet of the vehicles 110 to assign jobs to the vehicle 110 and the charging stations 104 at one or more charging sites 112. As described below, the EVFMS 108 matches the vehicles 110 to jobs and the charging stations 104 at the site based on, for example, characteristics of the vehicle 110, operation targets of the charging task of the job, characteristics of the charging stations 104 at the charging sites 112 and/or power availability at the charging sites 112. The characteristics of the vehicle 110 include, for example, static characteristics (e.g., make, model, passenger capacity, cargo capacity, towing capacity, etc.), dynamic characteristics (e.g., current SoC, current maintenance needs, cleaning needs, mileage, etc.), and charging characteristics (e.g., maximum charging rate, connector compatibility, etc.). The operation targets of the charging task of the job may include a required range and/or SoC and a deadline to achieve that required range and/or SoC. The characteristics of the charging stations 104 may include, for example, charging level (e.g., Level 1, Level 2, Level 3, etc.) and/or maximum power output (e.g., 1.9 kW, 6.6 kW, 19.2 kW, etc.), the connector type, and/or the space available for a vehicle to park in the vicinity of the charging station 104, etc. In some examples, the EVFMS 108 may also take into account the cost (e.g., in money and/or power resources, etc.) of preparing the vehicle 110 for the job, For example, the EVFMS 108 may consider if charging the vehicle 110 to meet the job would require drawing expensive electricity from the grid at a peak time, as well as the efficiency of the vehicle 110 doing the job. For example, a larger vehicle may require 1 Kilowatt-hour (kWh) per mile while a smaller vehicle which can still complete the job might only require 0.5 kWh per mile.

In some examples, the EVFMS 108 makes dynamic assignments of jobs and/or charging stations because the jobs, vehicles, charging stations, and power availability may change. For examples, jobs may be added at any point and/or deadlines may change, vehicles become available or unavailable at any time, and/or there may be changes in power availability, etc. The EVFMS 108 may, from time-to-time, evaluate/reevaluate which vehicles 110 are assigned to which jobs and to which charging stations 104. In such examples, the vehicles 110 may be instructed to move or be moved to a different charging station 104 after being assigned an initial charging station 104. Additionally, there may be more jobs than there are available vehicles 110 and, as a vehicle 110 becomes available to be assigned a job (e.g., arrives at the charging sites 112, etc.), the EVFMS 108 may reevaluate job and/or charging station assignments. In some examples, there may be more available vehicles 110 than assignable jobs. In such examples, the vehicles 110 may be assigned to a "charging pool" with a charging task set by the EVFMS 108 to facilitate the dynamic characteristics of the vehicles 110 in the charging pool to assign jobs that are queued in the future while prioritizing completing the charging tasks of the vehicles 110 already assigned a job.

The EVFMS 108 includes a vehicle 110 in the vehicles available for assignment when it determines that the vehicle 110 is in route to the charging site 112. In some examples, the vehicle 110 may interact with a sensor 116 when entering or in the vicinity of the charging site. The sensor 116 may be, for example, a barcode reader, a QR code reader, or a License Plate Recognition (LPR) system, etc. to detect and identify the vehicle 110. Additionally or alternatively, the sensor 116 may be one or more wireless sensors, such as Bluetooth® beacons, that detects interaction with a corresponding wireless controller on the vehicle 110. In such examples, the EVFMS 108 may determine that vehicle 110 is in route to the charging site 112 upon arrival of the vehicle 110 at the charging site 112. In some examples, the EVFMS 108 determines the route of the vehicle 110 based on coordinate data and/or navigation of the vehicle 110. For example, the EVFMS 108 may determine that the vehicle 110 is in route to the charging site 112 when the vehicle 110 crosses a geo-fence boundary defined around the charging site 112. In such examples, the EVFMS 108 may determine that vehicle 110 is in route to the charging site 112 upon arrival of the vehicle 110 at the charging site 112.

As described below, the EVFMS 108 assigns a job, and its associated charging task to the vehicle 110. The EVFMS 108 assigns the electric vehicle to one of the charging stations 104 of the charging site 112. The assignment may be based on, for example, (i) one or more static, dynamic, and/or charging characteristics of the vehicle 110, (ii) one or more operation targets of the charging task, (iii) one or more characteristics of the charging stations, and/or (iv) one or more power characteristics of the charging site 112. After assigning the charging station 104, the EVFMS 108 communicates the assignment. In some examples, the EVFMS 108 sends a message to an application operating on a mobile device 118 (e.g., a smart phone, a smart watch, a tablet, a laptop, etc.) or to an application operating on an infotainment center of the vehicle 110 to instruct the driver which parking space to park in and/or which charging station 104 to plug into. In some examples, the EVFMS 108 sends instructions to the autonomous driving subsystem of the vehicle 110 to instruct the autonomous or semi-autonomous vehicle to park in a designated parking spot associated with the charging station. Further, in some cases, EVFMS 108 sends instructions to vehicle 110 that include a particular charging cable and connector to use in the case in which a charging station 104 has multiple charging cables and connectors.

In response to determining that the vehicle 110 has plugged into the assigned charging station 104, the CMS 106 associates the electric vehicle with a charging session. In some examples, the CMS 106 uses an encoded/decoded pilot signal and/or using the assignment of the charging station 104. In some examples, the CMS 106 may associate the electric vehicle with the charging session based on the charging station assignment made by the EVFMS 108. In some cases, the driver of the vehicle 110 uses an application on a mobile device to indicate to the CMS 106 which vehicle 110 is plugged into the charging station 104. The CMS 106 then allocates charging power to the assigned charging station based on availability of power at the charging site 112 and/or the charging task assigned to the vehicle 110.

In the illustrated examples, the EVFMS 108 operates as a separate service to that of the CMS 106. For example, the CMS 106 may operate as a service on an edge server (e.g., deployed at charging site 112) and the EVFMS 108 may operate as a service on a cloud server. In such an arrangement, the CMS 106 may handle power management for charging site(s) 112 associated with the edge server and the EVFMS 108 may handle fleet management as described herein for multiple charging sites 112 associated with different edge servers. In some examples, one or more of the EVFMS 108 and CMS 106 may operate on the same server. In some examples, the EVFMS 108 and a version of the CMS 106 may operate on the edger server.

Example Method for Assigning Vehicles

Figure 2:
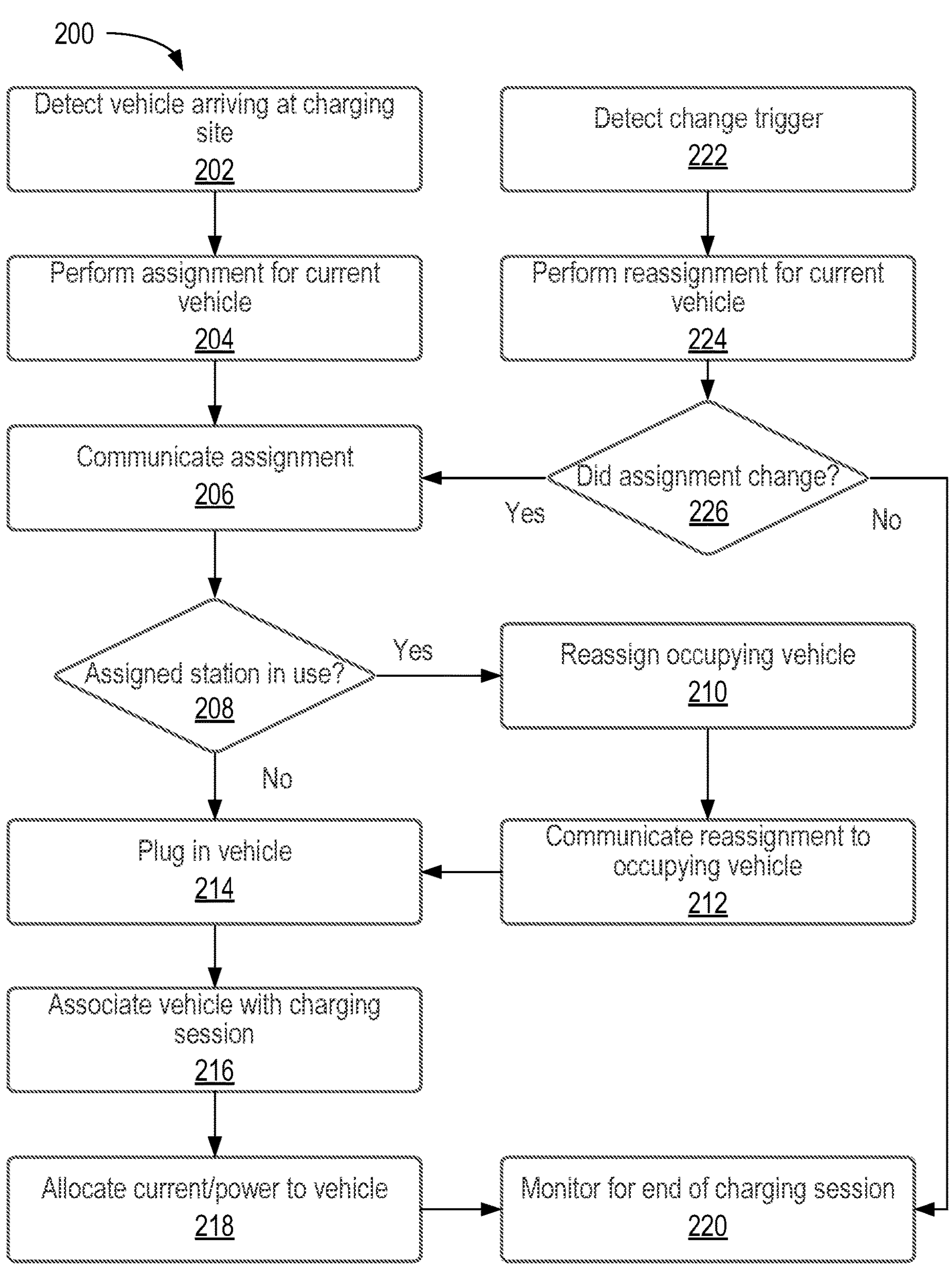
FIG. 2 is a flowchart of an example method to manage a fleet of electric vehicles with charging stations that have different charging capabilities.

FIG. 2 is a flowchart of an example method to manage a fleet of vehicles 110 with charging stations 104 have different charging capabilities, such as for a fleet management system like system 100 described with respect to FIG. 1. In some examples, method 200 may be performed by an EVFMS and/or a CMS, such as CMS 106 and/or EVFMS 108 of FIG. 1.

Method 200 start at step 202 with detecting a vehicle (e.g., the vehicle 110 of FIG. 1) arriving at a charging site (e.g., the charging site 112 of FIG. 1). In some examples, the EVFMS 108 detects the vehicle 110 as it enters the charging site 112. For example, when the vehicle 110 arrives at the charging site 112, its QR Code may be scanned, and identity of the vehicle 110 may be received or otherwise retrieved from a database (e.g., a database maintained by the CMS 106 and/or the EVFMS 108) that associates QR codes with corresponding vehicles.

Method 200 proceeds to step 204 with assigning a job and/or a charging station 104 to the vehicle 110. One method to solve the job and charging station 104 assignment problem is based on solving a mixed integer program that, in some cases, may be relaxed into a convex optimization problem.

For the mixed integer program, the assignment of vehicles 110 to jobs can be described using the matrix $A \in \{0, 1\}^{|V| \times |J|}$. In this matrix, each row represents one vehicle and each column one job. If $A_{ij}=1$, this means that vehicle i is assigned job j. Each vehicle can have at most one job and vice versa. This is enforced by stating $\Sigma_i A_{ij} \leq 1 \forall j$ and $\Sigma_i A_{ij} \leq 1 \forall i$. In the matrix, V is the set of vehicles to charge, J is the set of jobs where each job j includes an energy request $e_j$ and an availability vector $a_j \in \{0, 1\}^T$. Here T is the length of the optimization horizon.

The variables $$r_{ij}^{jobs} \in \mathbb{R}^T$$

represent the charging rate of the vehicle for that job, where r_ij^jobs>0 denotes charging. If discharging is supported by the vehicle 110 and the charging station 104, this is represented by r_ij^jobs<0. These variables are used to add constraints that if a vehicle is assigned to a job, the energy delivered to that vehicle is less than or equal to the energy requested by that job such that (sometimes referred to as the "energy constraint"):

$$\sum_t r_{ij}^{jobs}(t) * a_j(t) \leq A_{ij} * e_j \forall i, j \tag{1a}$$

The charge rate of the vehicle 110 is zero for jobs it was not assigned, such that:

$$r_{ij}^{jobs}(t) \leq A_{ij} a_j M \ \forall i, j, t \tag{2a}$$

In Equation 2a, above, M is a large constant greater than the max rate of any charging station 104. If $A_{ij}=1$, then the energy constraint set forth in Equations 1a and 2a become:

$$\sum_t r_{ij}^{jobs}(t) * a_j(t) \leq e_j \tag{1b}$$

$$r_{ij}^{jobs}(t) \leq a_j(t) M \tag{2b}$$

If $A_{ij}=0$, then the energy constraint set forth in Equations 1a and 2a become:

$$\sum_t r_{ij}^{jobs}(t) * a_j(t) \leq 0 \ \forall i, j \tag{1c}$$

$$r_{ij}^{jobs}(t) \leq 0 \tag{2c}$$

The charging rate of the vehicle is recoverable from these job specific rates is constrained as set forth in Equation 3:

$$\hat{r}_i(t) = \sum_j r_{ij}^{jobs}(t) \ \forall i \tag{3}$$

The assignment of vehicles 110 to charging stations 104 is described by $B \in \{0, 1\}^{|V| \times |S|}$. Here S is the set of charging stations 104, each of which has a max charging rate $\bar{r}_k$. In some embodiments, the EVFMS 108 enforces one-to-one mapping as before, i.e., $\Sigma_i B_{ik} \leq 1 \forall k$ and $\Sigma_j B_{ik} \leq 1 \forall i$. The disaggregated rate $$r_{ik}^{evse} \in \mathbb{R}^T$$

describes the charging rate of the vehicle 110 at each charging station 104. Since the vehicle 110 can only be at one charging station 104, there is only non-zero for one k.

$$r_{ik}^{evse}(t) \leq B_{ik} \bar{r}_k \ \forall i, k \tag{4a}$$

If $B_{ik}=1$, then the constraint set forth in Equation 4a becomes:

$$r_{ik}^{evse}(t) \leq \bar{r}_k \ \forall i, k \tag{4b}$$

If $B_{ik}=0$, then the constraint set forth in Equation 4a becomes:

$$r_{ik}^{evse}(t) \leq 0 \ \forall i, k \tag{4c}$$

The EVFMS 108 reaggregates the rates using the constraint set forth in Equation 5:

$$\hat{r}_i(t) = \sum_k r_{ik}^{evse}(t) \ \forall i \tag{5}$$

This introduces $|V|*T*(|J|+|S|)$ as additional continuous variables and $|V|(|J|+|S|)$ as binary variables.

In some examples, a job can only be serviced by a subset of vehicles 110 or only a subset of charging stations 104 are suitable for a given vehicle 110. These constraints mean that certain elements in the A and B matrices are 0. For example, $A_{ij}=0$ for all vehicles i which are not suitable for job j. Likewise, $B_{ik}=0$ for all vehicles i which are not suitable for charging station k. As described above, suitability is based on (i) one or more static, dynamic, and/or charging characteristics of the vehicle 110, (ii) one or more operation targets of the charging task, and/or (iii) one or more characteristics of the charging stations. For example, the vehicles i may be suitable for job j when they have the passenger capacity specified by job j.

In some examples, the energy required to complete a job may depend on the vehicle 110 assigned to it. In such example, the job energy requirement $e_j$ can be extended to be a matrix E where each element $E_{ij}$ is the energy required for vehicle i to complete job j. In such examples, the energy constraint becomes:

$$\sum_{t} r_{ij}^{jobs}(t) * a_j(t) \leq A_{ij} * E_{ij} \; \forall \, i, j \tag{6}$$

Using the constraints described above, the mixed integer program can be stated as:

$$\min_{\substack{\hat{r} \\ r^{job} \\ r^{evse} \\ A \\ B}} C\left(\hat{r}, r^{job}, r^{evse}, A, B\right) \tag{7}$$

$$\hat{r} \in \hat{R}$$

In Equation 7, the mixed integer program is constrained by the constraints set forth in Equations 1 through 6 as described herein. It should be understood that some of these equation are variants of other equations (e.g., Equation 1), are provided for illustrative purposes, and are not intended to define a constraint set. Here $\hat{r} \in \hat{R}$ refers to $\hat{r}$ living in some allowable set, which might include limits on the charging rates of each charging station 104 at each time depending on the state of the vehicle 110, site constraints, or other factors. Determining limits on the charging rates of each charging station may be performed by an adaptive load management algorithm. An example adaptive load management algorithm is described in U.S. Pat. No. 10,926,659 entitled, "Optimization Framework and Methods for Adaptive EV Charging," and U.S. Pat. No. 11,376,981 entitled, "Systems and Methods for Adaptive EV Charging."

In some example, the optimization may only include job assignment or vehicle assignment, where the A matrix or B matrix is fixed.

In some example, the constraint that the values in matrixes A and B are {0, 1} may be relaxed so that the values are in the continuous interval [0, 1]. This converts the mixed integer program to a convex problem. If values in matrixes A or B are non-integer after solving and have continuous values in the interval [0, 1], assignments are made by taking the highest value, then removing the station/job assigned to that vehicle, then renormalizing each column and row so that they sum to 1. In some examples, the EVFMS 108 begins with the highest value in the entire matrix. In some examples, the EVFMS 108 iterates over each column, taking the highest value for that column, then removing and renormalizing before proceeding to the next column. In some examples, the EVFMS 108 iterates over each row, taking the highest value for that row, then removing and renormalizing before proceeding to the next row.

In some example, when elements in matrixes A and B are non-integer, the EVFMS 108 performs assignments probabilistically. In such examples, the EVFMS 108 takes, as the values of the optimization, matrixes A and B as weights for a weighted sampling of the possible assignments. In some examples, the EVFMS 108 performs a joint sampling of an entire matrix A and/or B. In some examples, the sampling involves taking multiple samples and discharging samples which do not meet the constraints described above. In some examples, the EVFMS 108 samples each row/column separately, and removes the vehicles 110, jobs, and/or charging stations 104 from the pool as they are assigned, renormalizing the weights after each assignment.

In some examples, when the mixed integer program is solved repeatedly, for example periodically or when a new vehicle 110 or job arrives. In some such examples, it may not be desirable for the assignments of the charging stations 104 to change after each time the mixed integer program is solved, since this would require the vehicles 110 to move or be moved to a different charging station 104. In such examples, a station change penalty term is added to the optimization of the mixed integer program, as follows:

$$C_{\Delta B}(B, B^{prev}) = \gamma \sum_{i,k} [B_{ik}^{prev} - B_{ik}]_{+} \tag{8}$$

In the station penalty term, $B^{prev}$ is the assignment matrix from the previous solve, $[\bullet]_{+}$ indicates the max(•, 0), and $\gamma$ is the cost of moving the vehicle. Only changes from 1 to 0 are penalized so that new assignments are not penalized.

In some examples, it is not desirable for the job assignments to change after each time the mixed integer program is solved, such as when the vehicle job assignment is being shown to fleet operators or customers, since this would be disorienting and confusing to the person. The EVFMS 108 encodes this within the objective of the optimization by adding a job change penalty term to the optimization of the mixed integer program, as follows:

$$C_{\Delta A}(A, A^{prev}) = \lambda \sum_{i,j} \left[A_{ij}^{prev} - A_{ij}\right]_{+} \tag{9}$$

In the job penalty term, $A^{prev}$ is the assignment matrix from the previous solve, $[\bullet]_{+}$ indicates the max(•, 0), and $\lambda$ is the cost of changing the job assignment.

In some examples, a fleet operator may wish to prioritize some jobs over others when there may not be enough vehicles 110 to service all jobs. To encode this in the mixed integer program, the EVFMS 108 uses a non-assignment penalty term for not assigning each job. Letting $\rho_k$ be the assignment penalty, the penalty term is added to the objective function which incorporates the relative priority of each job.

$$C_{job}(B) = \sum_{i,j} \rho_j A_{ij} \tag{10}$$

In some examples, to distinguish between available jobs, the EVFMS 108 sets a job specific non-completion penalty on the minimum state-of-charge of the vehicle 110 assigned to the job by the deadline. For example, if $e_k$ is the energy required for the vehicle to meet its minimum state of charge and $a_k$ is the job availability vector, then the non-completion penalty term may be:

$$C_{comp}(\hat{r}) = \sum_{j} \delta_j \left( \left( \sum_{i,j} A_{ij} \hat{r}_i(t) j(t) \right) - e_j \right) \tag{11}$$

The non-completion penalty term creates a penalty for under delivering energy to job j. This may be in addition to or in place of the assignment penalty $C_{job}$ described above.

Solving the mixed integer program, the vehicle 110 is assigned a job with an associated charging task and a charging station 104. In some examples, the vehicle 110 may not be assigned a job because, for example, a job is not available. In some such examples, the vehicle 110 may be assigned to a default job with an associated charging task to wait until a new job arrives at, for example, step 220 below. The vehicles 110 that are assigned this default job are sometimes referred to as assigned to the "availability pool." In some examples, the availability pool is modeled as a set of additional jobs with lower priority than jobs from the job queue. In some examples, the penalty terms are lower or do not apply to vehicles 110 that are currently assigned to the availability pool. For example, the job penalty term may be lower for vehicles 110 that are currently assigned to the availability pool versus the penalties for vehicles assigned to jobs from the job queue. This, for example, facilitates vehicles 110 being assigned a charging station 104, when available, to charge while waiting to be assigned a job.

In some examples, the EVFMS 108 may alternatively use a rule-based assignment approach. The rule-based method allows the charging management system to be configured by selecting a set of rules and parameters to meet the fleet operator's needs.

In some examples, the EVFMS 108 may alternatively use a use a machine learning-based assignment approach. Machine learning-bases assignment may, for example, combine the speed of a rule-based approach with the data-driven insights of the optimization-based approach (e.g., using the mixed integer program). The machine learning-based approach tunes parameters of a parameterized function to approximate the assignments made by the optimization-based method. The parameterized function, $f(x, \phi)$, takes as inputs the state of the system, x, and tuned parameters, $\phi$. The output of the function are the assignments of vehicles to stations and/or vehicles to jobs. In some examples, the state of the system x includes: a list of current vehicles and their states, a list of current job requests, a list of current stations and their states, the price of electricity over time, the current and projected building load, the current and projected onsite energy production (e.g., solar photovoltaic and/or wind production, etc.), and/or projected ad-hoc demands. In some examples, the output of $f(x, \phi)$ are the matrices A and/or B as described above. As described above in connection with the optimization-based approach, in some examples, these matrices will have integer values, $\{0, 1\}$ or non-integer values.

In some cases, the function $f(x, \phi)$ is a decision tree. In some cases, the function $f(x, \phi)$ is a random forest. In some cases, the function $f(x, \phi)$ is an artificial neural network. In some cases, meta-algorithms such as boosting, bagging, or other methods are used to improve the performance of the learned function.

In some examples, the training data for tuning the function is taken from real assignments done by human experts. In some examples, the training data for tuning the function is taken from assignments determined by human experts on historical data, synthetic data, or generated scenarios even if these assignments were not used in practice. In some examples, the training data for tuning the function is taken from assignments determined by the optimization method described previously on historical data, synthetic data, or generated scenarios even if these assignments were not used in practice. In some examples, the training data for tuning the function is taken from real assignments done by the rule-based method described previously. In some examples, the training data for tuning the function is taken from assignments determined by the rule-based method described previously on historical data, synthetic data, or generated scenarios even if these assignments were not used in practice.

The method 200 continues at step 206 with communicating the assignment of the charging station 104 to the vehicle 110. In some examples, the assignment may be communicated via an application operating on the mobile device 118 or on an application operating on the infotainment center of the vehicle 110.

The method continues at step 208 with determining whether the charging station 104 assigned at step 204 is already in use. For example, when the mixed integer program is solved upon arrival of the vehicle 110, the EVFMS 108 may assign the vehicle 110 to a charging station 104 that is already assigned to a vehicle (sometimes referred to as an "occupying vehicle").

When the charging station 104 assigned at step 204 is already in use, the method continues at step 210 with reassigning the occupying vehicle to another charging station 104.

The method 200 continues at step 212 with communicating the reassignment to the occupying vehicle and/or a person associated with the occupying vehicle to cause the occupying vehicle to be moved to the reassigned charging station 104. In some examples, a driver may manually move the occupying vehicle. In some examples, the occupying vehicle may autonomously move the reassigned charging station 104.

The method 200 continues at step 214 with the vehicle 110 being plugged in to the charging station 104.

The method 200 continues at step 216 with associating the vehicle 110 with a charging session generated when the vehicle 110 is plugged in to the charging station 104. In some examples, this association is based on the assignment of the charging station 104 made at step 204. In some examples, this association is based on methods to determine the identity of the vehicle 110, such as (i) encoding and decoding a pilot signal sent to the vehicle 110 via the assigned charging station 104, (ii) reading, by the charging station 104, a radio frequency identifier (RFID) card associated with the vehicle 110, (iii) performing license plate recognition or recognition of a barcode/QR code affixed to the vehicle 110, and/or (iv) scanning, by mobile device (e.g., the mobile device 118 of FIG. 1) a barcode/QR code on the charging station 104, etc. This might include direct communication between the vehicle 110 and the charging station 104 such as via ISO 15118. In some examples, the encoding and decoding of the pilot signal sent to the vehicle 110 via the assigned charging station 104 may be used to confirm that the vehicle 110 is plugged into the correct charging station 104.

The method 200 continues at step 218 with allocating current/power (e.g., a current trajectory) to the vehicle 110.

The method 200 continues at step 220 with monitoring for the end of the charging session. In some examples, the charging session ends when the vehicle 110 has a threshold SoC (e.g., 80%, 90%, 100%, etc.). When the charging session ends, the charging station 104 is designated as free to be assigned another vehicle.

Method 200 may start at step 222 with detecting a change trigger. The change trigger may be a periodic signal defined to reevaluate assignments from time-to-time. The change trigger may be in response to an event, such as a new job request, a new vehicle arrival, changes in electricity prices, changes in onsite renewable generation, changes in other electrical demands on the charging site 112, demand response events, deviations of vehicles 110 from their charging schedule, or chargers going offline/coming online. In each of these example, the event may change the optimal allocation of vehicles 110 to jobs and charging stations 104.

The method 200 continues to step 224 with performing a reassignment. The reassignment may the same assignment process as described in step 204 above.

The method 200 continues to step 226 with a determination of whether the vehicle 110 has been assigned to a different charging station 104. When the vehicle has been assigned to a different charging station 104, the method continues to step 206 as described above. Otherwise, then the vehicle has not been assigned to a different charging station 104, the method 200 continues at step 220 with monitoring for the end of the charging session.

Note that FIG. 2 depicts one example of a method 200, but others are possible, which may include additional, fewer, or alternative steps consistent with the various methods described herein.

Example Method to Add a New Job

Figure 3:
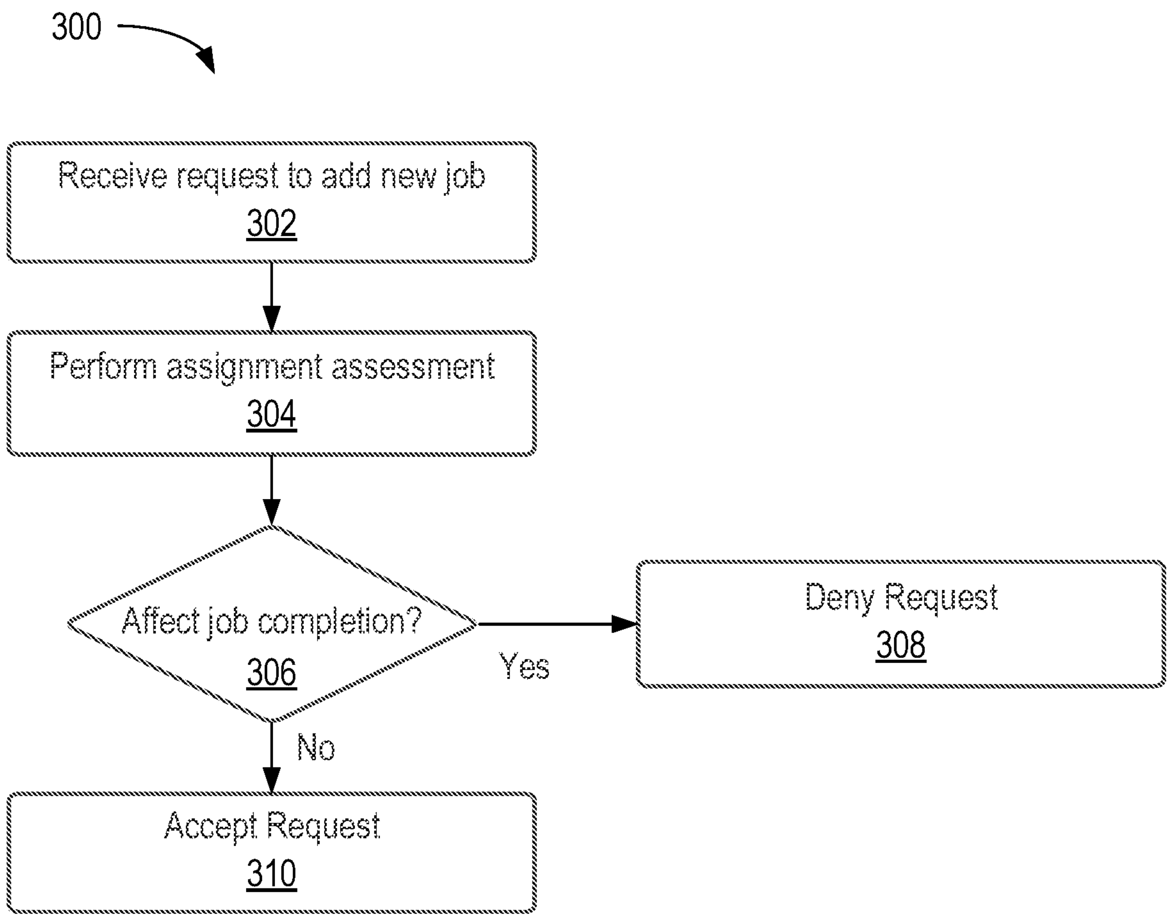
FIG. 3 is a flowchart of an example method to add a job assignment for the electric vehicles.

FIG. 3 is flowchart of an example method 300 to add a job assignment for the vehicles 110. In some examples, method 300 may be performed by an EVFMS and/or a CMS, such as CMS 106 and/or EVFMS 108 of FIG. 1.

Method 300 begins at step 302 with receiving a request for a new job to receive an assignment of a vehicle (e.g., the vehicle 110 of FIG. 1). Method 300 may be used, for examples, when a fleet manager may want to check if a job is feasible before adding it to the job queue. For example, a rental car fleet may want to know if a vehicle will be available for a rental before confirming the rental with their customer.

The method 300 continues at step 304 with performing a preliminary assignment using the same assignment process as described in step 204 above with respect to FIG. 2. This assignment does not automatically cause current assignments to change or the new job received at step 302 to be assigned a vehicle or charging session.

The method continues at step 306 with determining whether performing an assignment on the new job will prevent the completion of the new job or any job currently assigned to a vehicle 110. For example, adding the new job may slow charging of vehicles 110 that already assigned to the job. As another example, there may not be a vehicle currently available that meets the requirements of the job.

When performing an assignment on the new job will prevent the completion of the new job or any job currently assigned to a vehicle 110, the method continues at step 308 with denying the request.

When performing an assignment on the new job will not prevent the completion of the new job or any job currently assigned to a vehicle 110, the method continues at step 310 with accepting the request. In some examples, the preliminary assignments are then made to the vehicle(s) 110 affected. In some examples, acceptance will cause a trigger event that results in assignment of the new job to one of the vehicles 110.

Note that FIG. 3 depicts one example of a method 300, but others are possible, which may include additional, fewer, or alternative steps consistent with the various methods described herein.

Example Method for Vehicle Assignment

Figure 4:
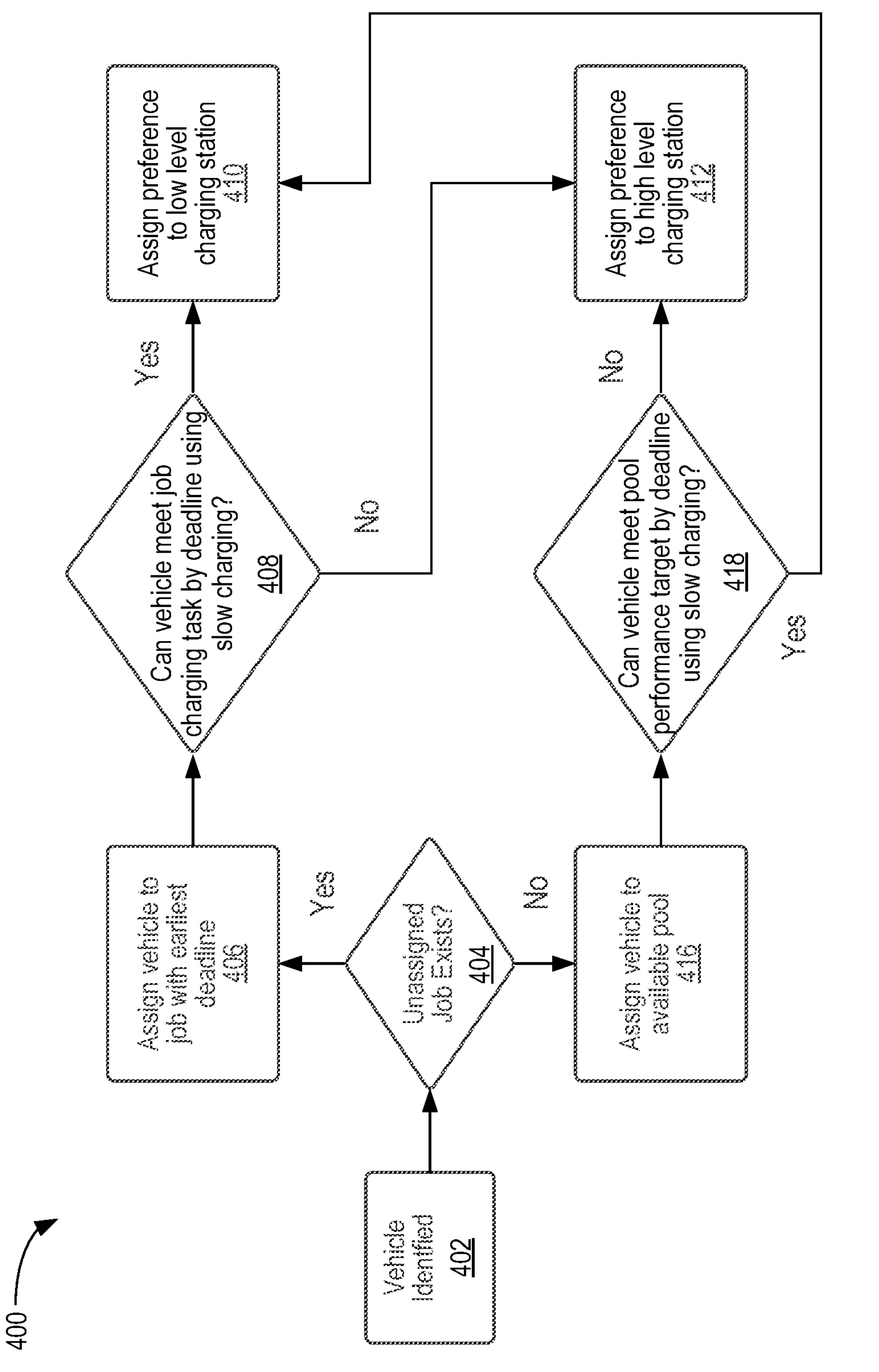
FIG. 4 is a flowchart of an example method to manage an electric vehicle returning to a depot.

FIG. 4 is flowchart of an example method 400 to assign a charging task and charging station (e.g., one of the charging stations 104 of FIG. 1) to the vehicle 110. In some examples, method 400 may be performed by an EVFMS and/or a CMS, such as CMS 106 and/or EVFMS 108 of FIG. 1. Method 400 may be used, for example, when the EVFMS 108 is set to optimize (e.g., use the mixed integer program) for the job assignment but not for the charging station assignment.

Method 400 begins at step 402, when a vehicle (e.g., one of the vehicles 110 of FIG. 1) arrives at the charging station 104, with identifying the vehicle 110. For example, when a vehicle arrives at a depot, a QR Code may be scanned or the vehicle may ping a wireless beacon.

The method 400 continues at step 404 with determining if there is an unassigned job. For example, there may be jobs in the job queue that are not current assigned a vehicle 110.

When there is an unassigned job, the method 400 continues at step 406 to assign a job from the job queue to the vehicle 110. In some examples then the newly arrived vehicle is assigned using the assignment process as described in step 204 above with respect to FIG. 2 (e.g., an optimization-based approach). In some examples, the vehicle 110 is assigned the job that (i) has the earliest deadline and (ii) that has operational targets the vehicle 110 can meet (e.g., a rules-based approach).

The method continues at step 408 with determining if the vehicle 110 can meet the charging deadline of the charging task specified by the assigned job the deadline at a low-level charging stations 104*a*.

When the vehicle 110 can meet it's the deadline at a low-level charging stations 104*a*, the method 400 continues at step 410 with assigning a preference of a low-level charging stations 104*a*. With this assigned preference, the EVFMS 108, for example, will assigned the vehicle to a low-level charging stations 104*a* if available and a high-level charging stations 104*b* if a low-level charging stations 104*a* is not available.

When the vehicle 110 cannot meet its deadline at a low-level charging stations 104*a*, the method 400 continues at step 412 with assigning a preference of a high-level charging stations 104*b*. With this assigned preference, the EVFMS 108, for example, will assigned the vehicle to a high-level charging stations 104*b*.

When there is not an unassigned job, the method 400 continues at step 414 to assign the vehicle 110 to the available pool.

The method continues at step 416 with determining if the vehicle 110 can meet the charging targets of the available pool at a low-level charging stations 104*a*.

When the vehicle 110 can meet the charging targets of the available pool at a low-level charging stations 104*a*, the method 400 continues at step 410 with assigning a preference of a low-level charging stations 104*a*. With this assigned preference, the EVFMS 108, for example, will assigned the vehicle to a low-level charging stations 104*a* if available and a high-level charging stations 104*b* if a low-level charging stations 104*a* is not available.

When the vehicle 110 cannot meet the charging targets of the available pool at a low-level charging stations 104*a*, the method 400 continues at step 412 with assigning a preference of a high-level charging stations 104*b*. With this assigned preference, the EVFMS 108, for example, will assigned the vehicle to a high-level charging stations 104*b*.

Note that FIG. 4 depicts one example of a method 400, but others are possible, which may include additional, fewer, or alternative steps consistent with the various methods described herein.

Example Method for Rules Based Job Assignment

Figure 5:
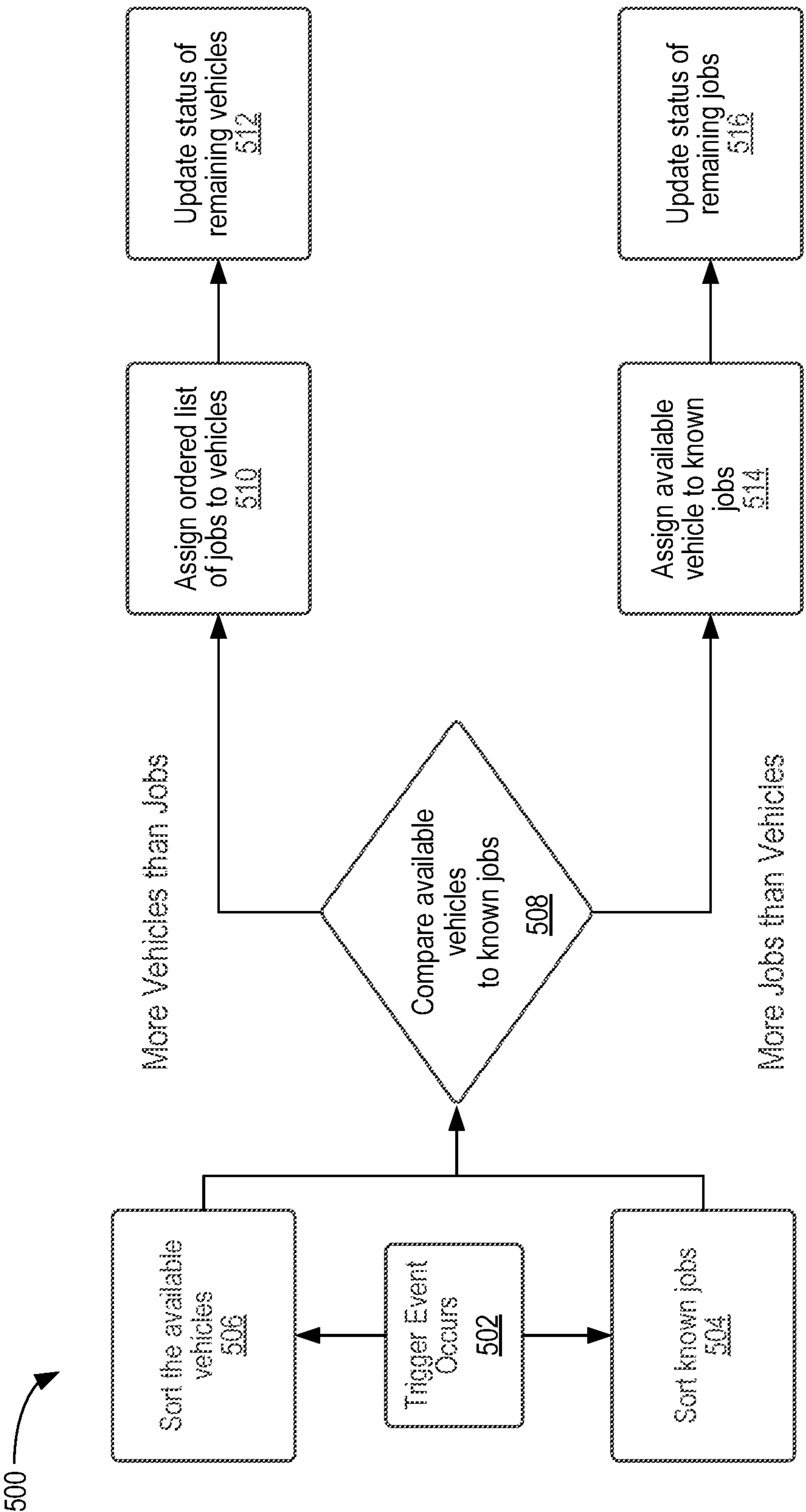
FIG. 5 is a flowchart of an example method to reevaluate job assignments for the electric vehicles.

FIG. 5 is flowchart of an example method 500 to assign jobs to vehicles 110 using a rules based system. In some examples, method 500 may be performed by an EVFMS and/or a CMS, such as CMS 106 and/or EVFMS 108 of FIG. 1.

Method 500 begins in a rule-based assignment system at step 502 when a trigger event occurs, such as a job being added to the job queue.

The method 500 continues at step 504 with sorting the jobs in the job queue by a desired characteristic, such as sorting by one of the operation targets of the charging tasks of the jobs. For example, the jobs may be sorted in descending order by charging deadline.

The method 500 continues at step 506 by sorting the vehicles 110 by a designed characteristics, such as the static, dynamics, or charging characteristics. For example, the vehicles 110 may be sorted by descending current SoC.

The method 500 continues at step 508 with comparing the available vehicles 110 to jobs in the jobs queue.

If there are more vehicles than jobs, the method 500 continues at step 510 with assigning a vehicle 110 to every job.

The method continues at step 512 with assigning the remaining unassigned vehicles 110 to the available pool.

If there are more jobs than vehicles 110, the method 500 continues at step 514 with assigning every vehicle 110 to a job.

The method continues at step 516 with assigning the remaining unassigned jobs back to the job queue. In some examples, this triggers an alert to the fleet manager that jobs will be unfilled. In some cases, the EVFMS 108 populates or updates a database of unclaimed jobs which can displayed to the user via a website, app, API integration, or other means.

Note that FIG. 5 depicts one example of a method 500, but others are possible, which may include additional, fewer, or alternative steps consistent with the various methods described herein.

Example Method for Rules-Based Charging Station Assignment

Figure 6:
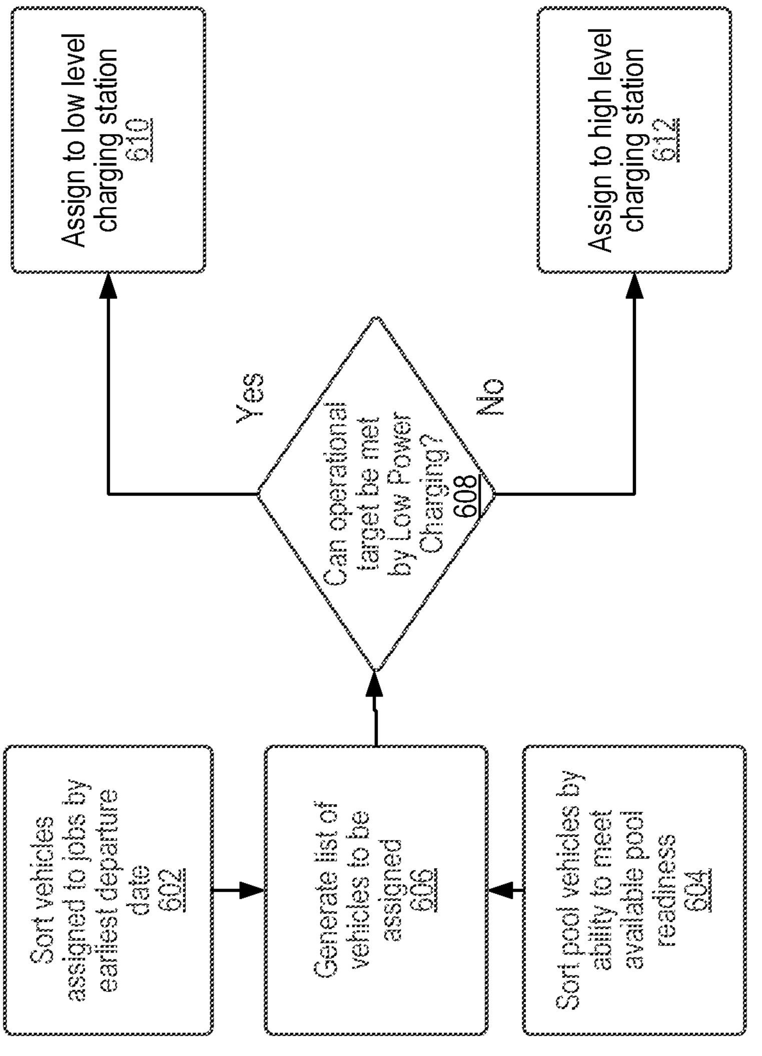
FIG. 6 is a flowchart of an example method to handle charging station assignment for the electric vehicles.

FIG. 6 is flowchart of an example method 600 to assign vehicles 110 to charging stations (e.g., the charging stations 104 of FIG. 1) using a rules based system. In some examples, method 600 may be performed by an EVFMS and/or a CMS, such as CMS 106 and/or EVFMS 108 of FIG. 1.

Method 600 begins at step 602 with sorting vehicles assigned to jobs by earliest departure date as specified by the charging task of the jobs.

The method 600 continues at step 604 with sorting vehicles in the available pool by ability to meet the available pool readiness based on the static, dynamic, and/or charging characteristics of the vehicles 110 and/or other considerations that may be specified by a fleet manager. For example, if the availability pool has a particular kind of popular vehicle (e.g., a sedan, etc.) with at least 80% SOC, the fleet manager my specify that the EVFMS 108 prioritize charging vehicles that are sedans, in order of the highest SOC, support a potential new job as soon as possible.

The method 600 continues at step 606 with generating a list of vehicles 110 to be assigned with the vehicles 110 sorted at step 602 at first and the vehicles 110 sorted at 604 second. Given the EVFMS 108 may have more vehicles 110 competing for fewer charging stations with various power constraints, the EVFMS 108 generates the list of vehicles in a prioritized order.

The method continues at step 608 with determining whether the operational target can be met by a low-level charging stations 104*a* for each vehicle 110 on the list in descending order.

When the operational target can be met by a low-level charging stations 104*a*, the method 600 continues at step 610 with assigning the vehicle 110 being considered to a low-level charging stations 104*a*. In some examples, when a low-level charging stations 104*a* is not available, the vehicle 110 to be considered may be assigned to a high-level charging stations 104*b* if available. If no charging station 104 is available, the EVFMS 108 may generate an alert.

When the operational target cannot be met by a low-level charging stations 104*a*, the method 600 continues at step 612 with assigning the vehicle 110 being considered to a high-level charging stations 104*b*. If no high-level charging stations 104*b* is available and the vehicle 110 is assigned to a job, the EVFMS 108 may generate an alert. While the example of the method 600, the charging stations 104 are divided into two categories (e.g., the low-level charging stations 104*a* and the high-level charging stations 104*b*), the charging stations 104 may be divided into more categories (e.g., 1.9 kW-capable charging stations, 6.6 kW-capable charging stations, 19.2 kW-capable charging stations, etc.) where, for example, the EVFMS 108 selects the charging station 104 with the lowest maximum power output that is capable of charging the vehicle 110 to meet the operational target.

In some examples, when there are more vehicles 110 to be charged then charging stations, method 600 may be repeated as vehicles 110 fulfill the charging tasks of the assigned job or available pool. In such examples, the vehicles that have fulfill the charging tasks of the assigned job or available pool are removed from consideration (e.g., at steps 602 and 604) and are unassigned to charging stations.

Note that FIG. 6 depicts one example of a method 600, but others are possible, which may include additional, fewer, or alternative steps consistent with the various methods described herein.

Example Method for Rules-Based Charging Station Selection

Figure 7:
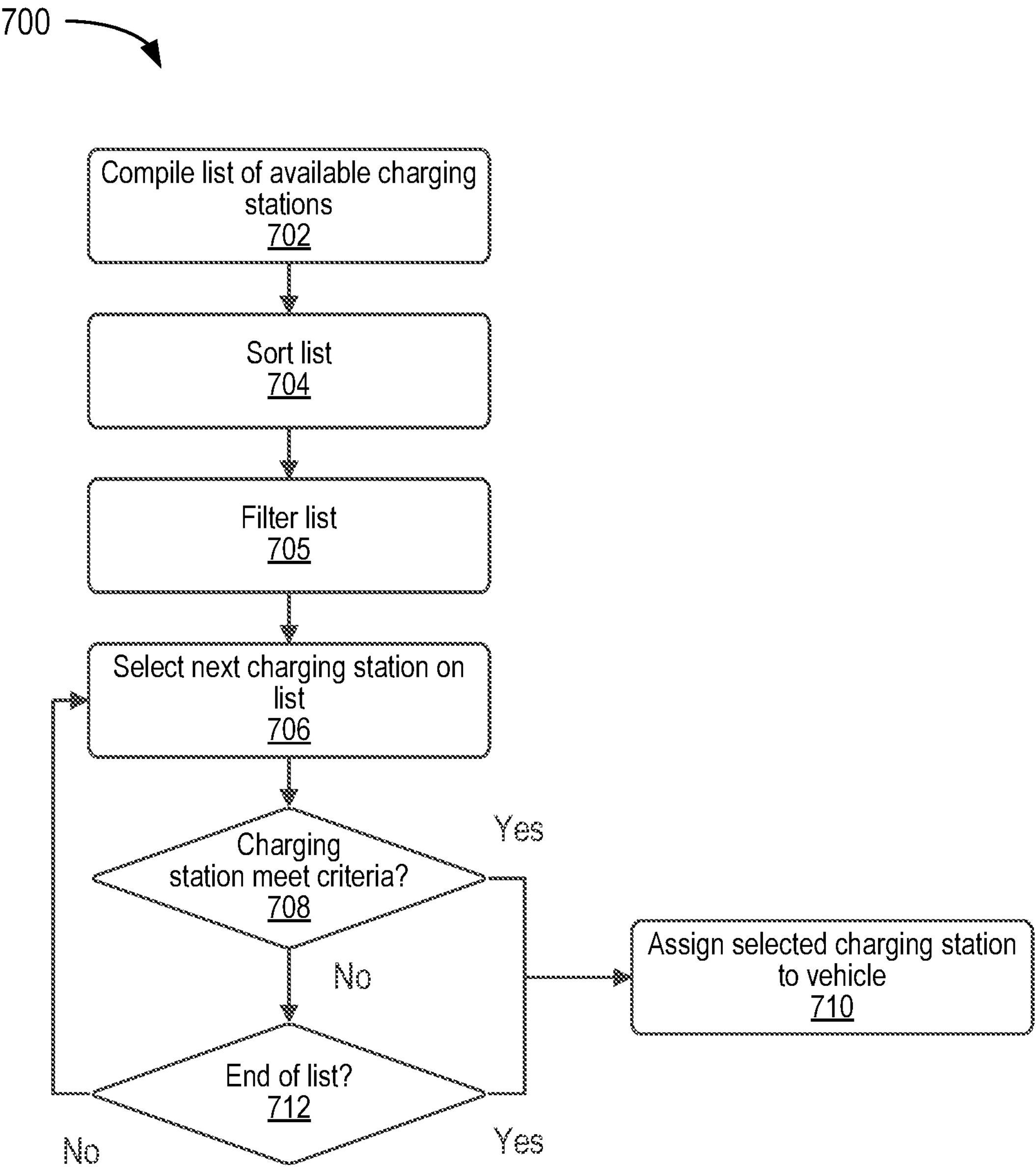
FIG. 7 is a flowchart of an example method for rule-based assignment of charging stations.

FIG. 7 is flowchart of an example method 700 to select a charging station (e.g., the charging stations 104 of FIG. 1) to assign to a vehicle (e.g., one of the vehicles 110 of FIG. 1) using a rules based system. In some examples, method 700 may be performed by an EVFMS and/or a CMS, such as CMS 106 and/or EVFMS 108 of FIG. 1. As described in connection with method 700, the rules-based method may not assign the charging stations 104 based on a categorization of the charging stations 104 (e.g., into high power charging stations and low power charging stations), but rather on a sorted list of the desired characteristics of the charging stations 104. For example, the charging site 112 may have charging stations 104 with maximum power outputs of 1.4 kW, 1.9 kW, 6.6 kW, and 19.2 kW.

Method 700 begins at step 702 with generating a list of all available charging stations 104. In some examples, the EVFMS 108 may maintain a set of criteria to determine if the charging station 104 is available. For examples, the criteria may establish that the charging station 104 is available when: (i) no vehicle 110 is plugged into the charging station 104, (ii) a vehicle 110 assigned to the availability pool is plugged into the charging station 104, (iii) the charging station 104 is not designated as available for general assignment (e.g., charging stations 104 designated for special purposes, etc.), (iv) the vehicle 110 plugged into the charging station 104 can accomplish its charging task with a lower power charging station 104, and/or (v) all charging stations 104 at the charging site 112, etc.

The method 700 continues at step 704 with sorting the available charging stations 104. In some examples, the available charging stations 104 may be sorted by maximum power output (e.g., 1.9 kW, 6.6 kW, 19.2 kW, etc.) in increasing order of maximum power output (e.g., the first element on the list being the charging station 104 with the smallest maximum power output, etc.). In some examples, available charging stations 104 may be sorted by any charging station characteristics as described above. In some such examples, the list is ordered starting with the charging station 104 with the least of the criteria and then in increasing order.

The method 700 continues at step 705 with filtering the sorted list of the available charging stations 104 by, for example, connector type, current type (e.g., AC or DC), parking space dimensions, cord length, etc. The filter criteria may be specific to the vehicle 110 that is to be assigned (e.g., based on static, dynamic, and/or charging characteristics of the vehicle 110).

The method 700 continues at step 706 with selecting the next charging station 104 on the sorted list. On the first iteration, for example, the next charging station 104 on the sorted list is the first charging station 104 on the sorted list.

The method continues at step 708 with determining whether the selected charging station 104 is a match for the vehicle 110 to be assigned. For example, the selected charging station 104 is a match when the characteristics of the selected charging station 104 meet or exceed criteria based on the static, dynamic, and charging characteristics of the vehicle 110 and the charging task of the job assigned to the vehicle 110. For example, the selected charging station 104 may match the vehicle 110 when the maximum power output is sufficient to charge the vehicle 110 by the deadline defined by the charging task. In some examples, the CMS 106 may specify a minimum power level needed to meet the charging task. In some examples, an additional early stopping criteria is included. When the power capacity of the selected charging station 104 exceeds the input power limit of the vehicle 110, the method 700 may determine that the selected charging station is not a match for the vehicle 110. This prevents wasting available power capacity on vehicles which cannot use the full power output of the charger. In some examples, the input power limit may be a function of the charging station 104 characteristics, for example a vehicle may be able to accept higher power from a DC charging station than an AC one.

When the selected charging station 104 is a match for the vehicle 110 to be assigned, the method 700 continues to step 710 with assigning the vehicle 110 to the selected charging station 104.

When the selected charging station 104 is not a match for the vehicle 110 to be assigned, the method 700 continues to step 712 with determining if the selected charging station 104 is the last charging station 104 on the sorted list.

When the selected charging station 104 is the last charging station 104 on the sorted list, the method 700 continues to step 710 with assigning the vehicle 110 to the selected charging station 104. In some examples, the EVFMS 108 may provide an alert that the vehicle 110 was assigned to a charging station 104 that is not a match.

When the selected charging station 104 is not the last charging station 104 on the sorted list, the method 700 continues to step 706 with selecting the next charging station 104 on the list.

Note that FIG. 7 depicts one example of a method 700, but others are possible, which may include additional, fewer, or alternative steps consistent with the various methods described herein.

Example Processing Device(s)

Figure 8:
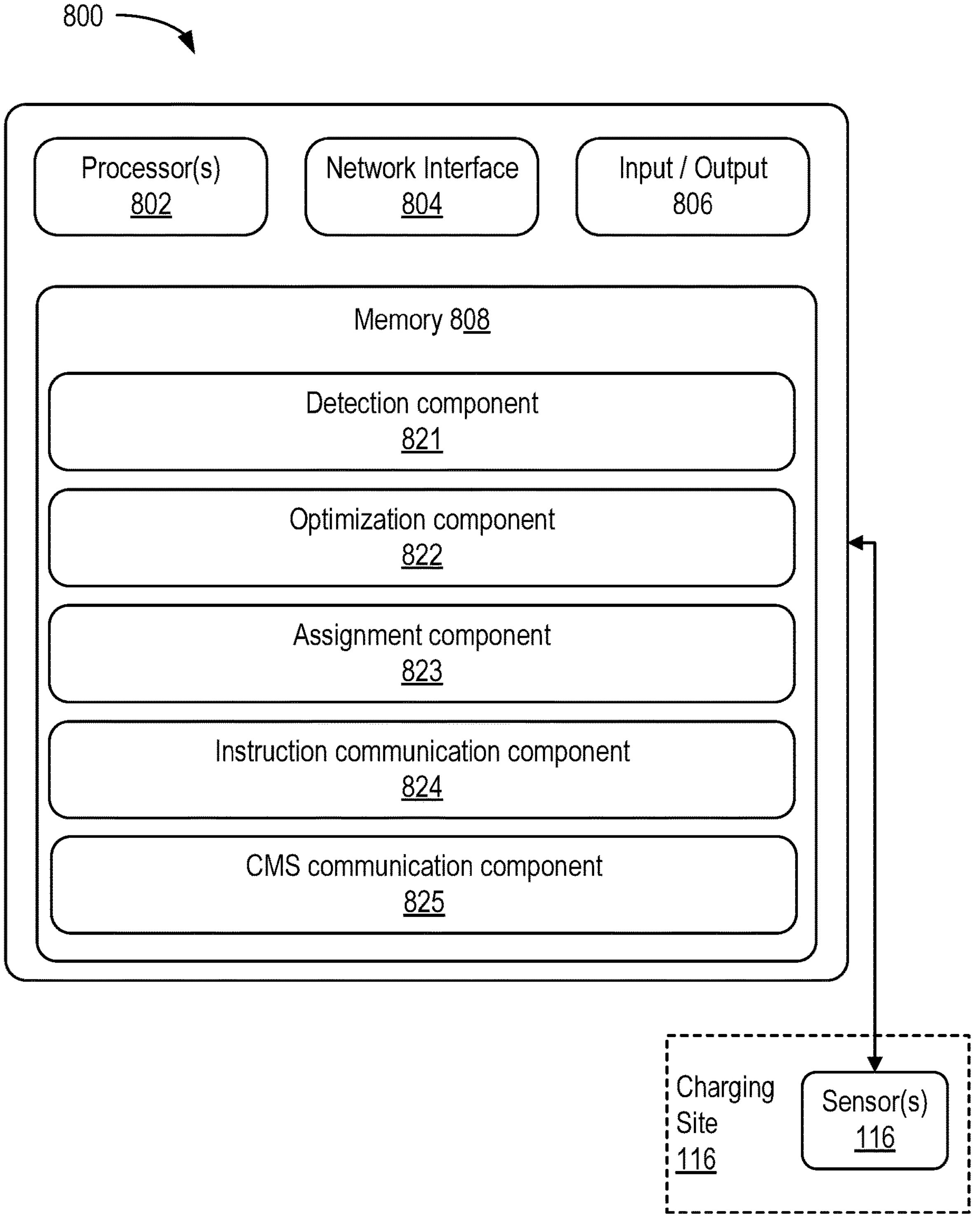
FIG. 8 depicts an example processing system of an electric vehicle fleet management system configured to perform the methods described herein.

FIG. 8 depicts an example processing system 800 configured to perform various methods described herein. The processing system 800 may be, for example, an example of a processing system of the EVFMS 108 of FIG. 1.

Processing system 800 includes one or more processors 802. Generally, a processor 902 is configured to execute computer-executable instructions (e.g., software code) to perform various functions, as described herein. The processor(s) 802 may be any suitable processing device or set of processing devices such as, but not limited to: a microprocessor, a microcontroller-based platform, a suitable integrated circuit, one or more FPGAs, and/or one or more ASICs.

Processing system 800 further includes a network interface 804, which generally provides data access to any sort of data network, including local area networks (LANs), wide area networks (WANs), mesh networks, wireless personal area networks, the Internet, and the like.

Processing system 800 further includes input(s) and output(s) 806, which generally provide means for providing data to and from processing system 800, such as via connection to computing device peripherals, including user interface peripherals.

Processing system 800 further includes a memory 808 comprising various components. The memory 808 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 808 includes multiple kinds of memory, particularly volatile memory and non-volatile memory.

In this example, memory 808 includes a detection component 821 to detect when a vehicle (e.g., one of the vehicles 110 of FIG. 1) is in route to a charging site (e.g., the charging site 112 of FIG. 1) and/or identify the vehicle 110 when it arrives at the charging site. In some examples, the detection component 821 is communicatively coupled to the sensor(s) 116 to detect the vehicle 110 arriving at or approaching the charging site 112. The memory 808 also includes an optimization component 822 to calculation optimization of assignment of vehicles 110 to jobs and to the charging stations 104 as described herein. The memory 808 also includes an assignment component 823 to assign vehicles 110 to jobs and charging stations 104 as described herein. The memory 808 also includes an instruction communication component 824 communicate with the mobile devices 118 and/or vehicles 110 as described herein. The memory 808 also includes a CMS communication component 825 communication with the CMS 106 as described herein.

Processing system 800 may be implemented in various ways. For example, processing system may be implemented within an EVFMS 108. However, in other implementations, aspects of processing system 800 may be distributed, such as between charging stations 104, the CMS 106, the EVFMS 108 of FIG. 1, and other processing equipment, including on-site, remote, or cloud-based processing equipment. Note that in various implementations, certain aspects may be added to, substituted, and/or omitted from processing system 800.

Figure 9:
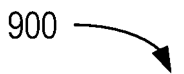
FIG. 9 depicts an example processing system of a charging management system configured to perform the methods described herein.
Figure 9:
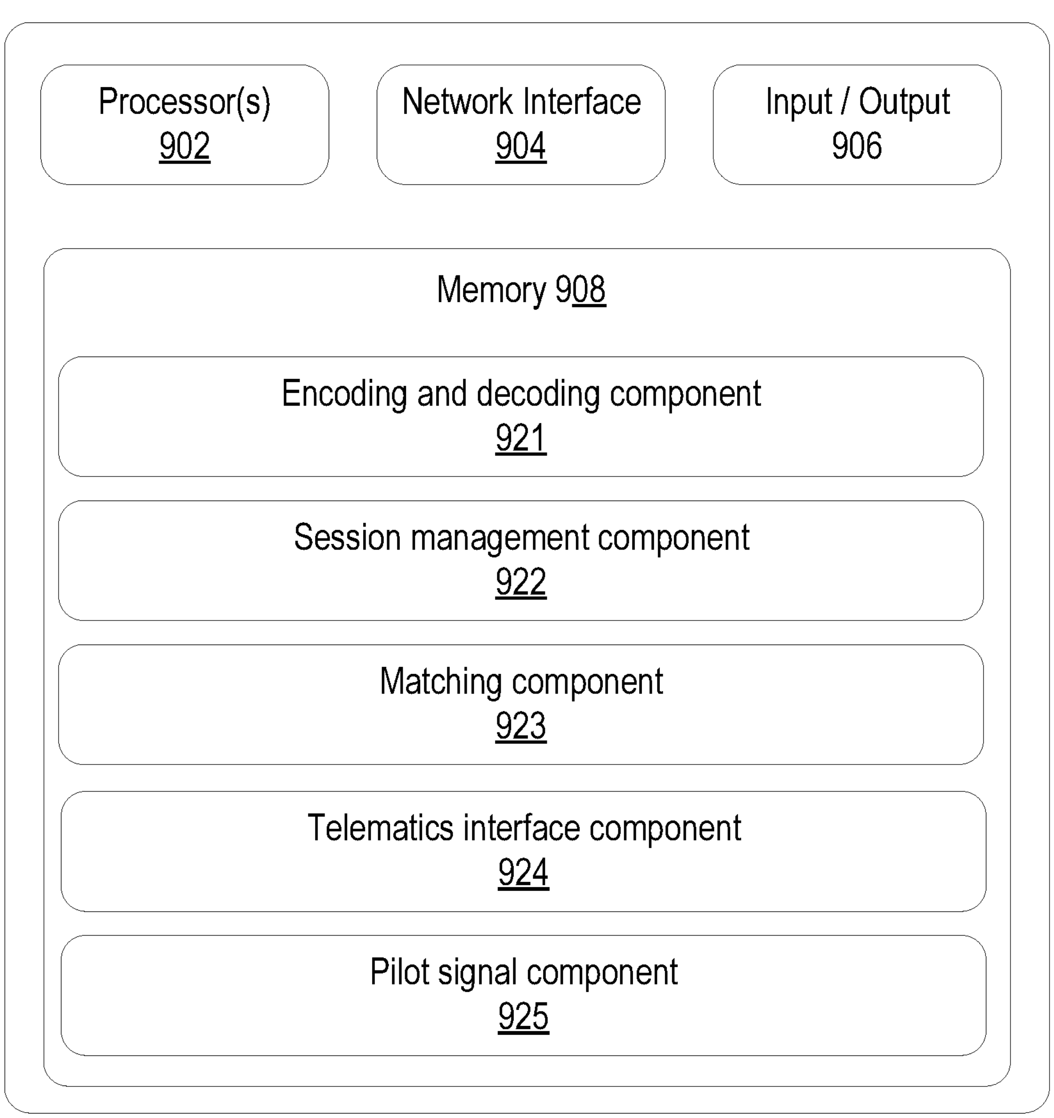

FIG. 9 depicts another example processing system 900 configured to perform the various described herein. The processing system 900 may be, for example, an example of a processing system of the CMS 106 of FIG. 1

Processing system 900 includes one or more processors 902. Generally, a processor 902 is configured to execute computer-executable instructions (e.g., software code) to perform various functions, as described herein. The processor(s) 902 may be a processor such as the processor 802 described above.

Processing system 900 further includes a network interface 904, which generally provides data access to any sort of data network, including local area networks (LANs), wide area networks (WANs), mesh networks, wireless personal area networks, the Internet, and the like.

Processing system 900 further includes input(s) and output(s) 906, which generally provide means for providing data to and from processing system 900, such as via connection to computing device peripherals, including user interface peripherals.

Processing system 900 further includes a memory 908 comprising various components. The memory 908 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 908 includes multiple kinds of memory, particularly volatile memory and non-volatile memory.

In this example, memory 908 includes an encoding and decoding unit 921 to encode the station identifier into a sequence of one or more pilot signals and decode the station identifier from telematics data as described herein. The memory 908 also includes a session management component 922 to track charging sessions and maintain a session table (e.g., the session table 114 of FIG. 1) as described herein. The memory 908 also includes a matching component 923 to pair charging sessions with vehicles (e.g., one of the vehicles 110 of FIG. 1) that use the charging stations 104 as described herein. The memory 908 also includes a telematics interface component 924 communicate with the telematics system 102 as described herein. The memory 908 also includes a pilot signal component 925 to generate pilot signals for the charging stations 104 as described herein.

Processing system 900 may be implemented in various ways. For example, processing system may be implemented within a CMS 106. However, in other implementations, aspects of processing system 900 may be distributed, such as between charging stations 104, the CMS 106, edge network servers, and other processing equipment, including on-site, remote, or cloud-based processing equipment. Note that in various implementations, certain aspects may be added to, substituted, and/or omitted from processing system 900.

Figure 10:
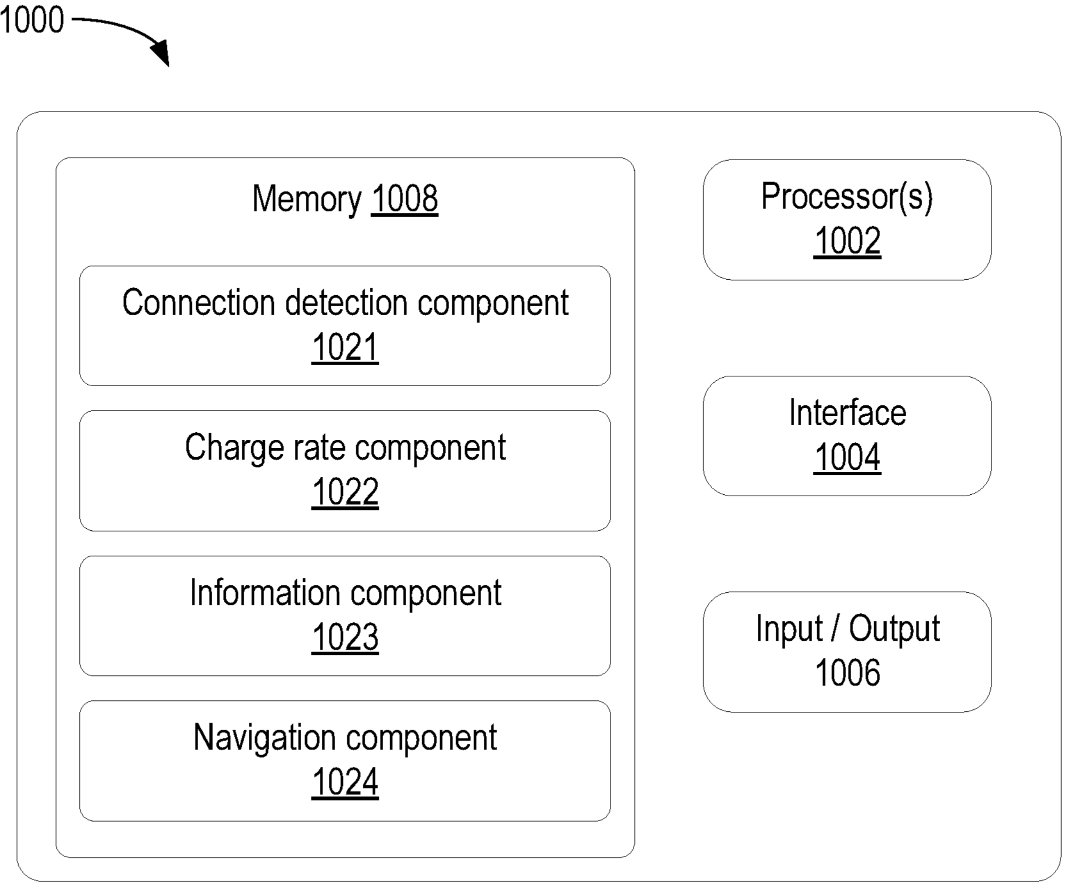
FIG. 10 depicts an example processing system of a vehicle configured to perform the methods described herein.

FIG. 10 depicts an example processing system 1000 configured to perform the methods described herein. The processing system 1000 may be, for example, an electronic control unit (ECU) of a vehicle (e.g., one of the vehicle 110 of FIG. 1), such as a battery control unit, a vehicle control unit, a telematics control unit, an infotainment center, an autonomous navigation unit, or an on-board computing platform, etc.

Processing system 1000 includes one or more processors 1002. Generally, a processor 1002 is configured to execute computer-executable instructions (e.g., software code) to perform various functions, as described herein. The processor(s) 1002 may be a processor such as the processor 802 described above.

Processing system 1000 further includes a network interface 1004, which generally provides data access to any sort of data network, including local area networks (LANs), wide area networks (WANs), wireless personal area networks, and the like.

Processing system 1000 further includes input(s) and output(s) 1006, which generally provide means for providing data to and from processing system 1000, such as via connection to computing device peripherals, including user interface peripherals.

Processing system 1000 further includes a memory 1008 comprising various components. The memory 1008 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 1008 includes multiple kinds of memory, particularly volatile memory and non-volatile memory.

In this example, memory 1008 includes a connection detection component 1021 to detect when the vehicle 110 is plugged into a charging station (e.g., one of the charging stations 104 of FIG. 1). The memory 1008 also includes a charge rate component 1022 to control the charging of the batteries of the vehicle 110 based on a charge trajectory received from the charging station 104. The memory 1008 includes an information component 1023 to receive and display information (e.g., from the EVFMS 108). In some examples, the memory 1008 includes a navigation component 1024 to autonomously move the vehicle 110 as described herein.

Note that in various implementations, certain aspects may be added to, substituted, and/or omitted from processing system 1000.

Example Clauses

Implementation examples are described in the following numbered clauses:

Clause 1: A method for electric vehicle fleet management, the method comprising: determining that an electric vehicle is in route to a charging site including a plurality of charging stations; assigning a charging task to the electric vehicle; assigning the electric vehicle to one of the plurality of charging stations based on: one or more vehicle characteristics; one or more operation targets of the charging task; and one or more characteristics of the plurality of charging stations; in response to determining that the electric vehicle has plugged into the assigned charging station, associating the electric vehicle with a charging session; and allocating charging power to the assigned charging station.

Clause 2: The method of Clause 1, further comprising, when the assigned charging station is occupied by an occupying vehicle, reassigning the occupying vehicle to a different one of the plurality of charging stations and issuing instructions to cause the occupying vehicle to move.

Clause 3: The method of an of Clauses 1 or 2, wherein the one or more operation targets of the charging task include a minimum state of charge for the electric vehicle and a deadline by which the electric vehicle is to achieve at least the minimum state of charge.

Clause 4: The method of any of Clauses 1 through 3, wherein assigning the charging task to the electric vehicle includes: selecting the charging task from a list of charging tasks sorted by one of the operation targets of the charging task; and assigning the electric vehicle to one of the plurality of charging stations with a low power charging property based on the electric vehicle being able to meet the one of the operation targets at one of the plurality of charging stations with the low power charging property.

Clause 5: The method of Clause 4, wherein the one of the operation targets of the charging task is a deadline by which the electric vehicle is to achieve at least a minimum state of charge.

Clause 6: The method of any of Clauses 1 through 5, wherein assigning the charging task to the electric vehicle further includes performing a mixed integer program.

Clause 7: The method of Clause 6, wherein assigning the charging task to the electric vehicle further includes performing a convex relaxation of the mixed integer program.

Clause 8: The method of Clauses 6 or 7, wherein assigning the charging task to the electric vehicle further includes performing the mixed integer program including job change and/or station change penalty term.

Clause 9: The method of any of Clauses 6 through 8, wherein assigning the charging task to the electric vehicle further includes performing the mixed integer program including a non-assignment penalty term.

Clause 10: The method of any of Clauses 6 through 9, wherein assigning the charging task to the electric vehicle further includes performing the mixed integer program including a non-completion penalty term.

Clause 11: The method of any of Clauses 1 through 10, wherein allocating charging power to the assigned charging station further includes assigning a charging trajectory including of one or more charging rates over time to the charging station based on: the operation targets of the charging task assigned to the electric vehicle; a maximum charge rate of the electric vehicle; and a maximum power output of the charging station.

Clause 12: The method of Clause 11, wherein assigning the charging trajectory further includes performing load management between the plurality of charging stations to stay below an electrical limit of the charging site, or to reduce the operating costs or emissions of a site.

Clause 13: The method of Clause 1, wherein assigning the charging task to the electric vehicle further includes performing a rules-based assignment or a machine learning-based assignment.

Clause 14: A processing system, comprising: a memory comprising computer-executable instructions; and a processor configured to execute the computer-executable instructions and cause the processing system to perform at least the following: determine that an electric vehicle is in route to a charging site including a plurality of charging stations; assign a charging task to the electric vehicle; assign the electric vehicle to one of the plurality of charging stations based on: one or more vehicle characteristics; one or more operation targets of the charging task; and one or more characteristics of the plurality of charging stations; in response to determining that the electric vehicle has plugged into the assigned charging station, associate the electric vehicle with a charging session; and allocate charging power to the assigned charging station.

Clause 15: The processing system of clause 14, wherein the computer-executable instructions further cause the processing system to reassign the occupying vehicle to a different one of the plurality of charging stations and issuing instructions to cause the occupying vehicle to move, when the assigned charging station is occupied by an occupying vehicle.

Clause 16: The processing system of clause 14 and/or 15, wherein the one or more operation targets of the charging task include a minimum state of charge for the electric vehicle and a deadline by which the electric vehicle is to achieve at least the minimum state of charge.

Clause 17: The processing system of any of clauses 14 through 16, wherein assigning the charging task to the electric vehicle includes: selecting the charging task from a list of charging tasks sorted by one of the operation targets of the charging task; and assigning the electric vehicle to one of the plurality of charging stations with a low power charging property based on the electric vehicle being able to meet the one of the operation targets at one of the plurality of charging stations with the low power charging property.

Clause 18: The processing system of any of clauses 14 through 17, wherein allocating charging power to the assigned charging station further includes assigning a charging trajectory including of one or more charging rates over time to the charging station based on: the operation targets of the charging task assigned to the electric vehicle; a maximum charge rate of the electric vehicle; and a maximum power output of the charging station.

Clause 19: A non-transitory computer-readable medium comprising computer-executable instructions that, when executed by a processor of a processing system, cause the processing system to perform at least the following: determine that an electric vehicle is in route to a charging site including a plurality of charging stations; assign a charging task to the electric vehicle; assign the electric vehicle to one of the plurality of charging stations based on: one or more vehicle characteristics; one or more operation targets of the charging task; and one or more characteristics of the plurality of charging stations; in response to determining that the electric vehicle has plugged into the assigned charging station, associate the electric vehicle with a charging session; and allocate charging power to the assigned charging station.

Clause 20: the non-transitory computer-readable medium of clause 19, wherein the computer-executable instructions further cause the processing system to reassign the occupying vehicle to a different one of the plurality of charging stations and issuing instructions to cause the occupying vehicle to move, when the assigned charging station is occupied by an occupying vehicle.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for electric vehicle fleet management, the method comprising:

determining, via one or more sensors, that a first electric vehicle is in route to a charging site including a plurality of charging stations comprising a plurality of low-level charging stations and a plurality of high-level charging stations;

automatically matching, based on a machine learning-based assignment, a first charging task to the first electric vehicle;

automatically matching the first electric vehicle to a first charging station of the plurality of low-level charging stations based on:

one or more first operation targets of the first charging task being achievable by a low-level charging station; and determining that there is not a sufficient amount of power available at the charging site to charge the first electric vehicle with a high-level charging station concurrently as charging a second electric vehicle with another high-level charging station;

automatically matching the second electric vehicle to a second charging station of the plurality of high-level charging stations based on:

one or more second operation targets of a second charging task associated with the second electric vehicle not being achievable by a low-level charging station;

in response to determining that the first electric vehicle has plugged into the automatically matched first charging station, associating the first electric vehicle with a first charging session;

in response to determining that the second electric vehicle has plugged into the automatically matched second charging station, associating the second electric vehicle with a second charging session;

determining an allocation of power among the plurality of charging stations for an electric vehicle fleet management at the charging site, the allocation of power based on at least one of the one or more first operation targets or the one or more second operation targets; and allocating, based on the determined allocation of power, first charging power to the automatically matched first charging station and second charging power to the automatically matched second charging station.

2. The method of claim 1, further comprising, when the automatically matched first charging station is occupied by an occupying vehicle, matching the occupying vehicle to a different charging station of the plurality of charging stations and issuing instructions to cause the occupying vehicle to move.

3. The method of claim 1, wherein the one or more first operation targets of the first charging task include a minimum state of charge for the first electric vehicle and a deadline by which the first electric vehicle is to achieve at least the minimum state of charge.

4. The method of claim 1, wherein automatically matching the first charging task to the first electric vehicle includes:

selecting the first charging task from a list of charging tasks sorted by one of the one or more first operation targets of the first charging task.

5. The method of claim 4, wherein the one of the one or more first operation targets of the first charging task is a deadline by which the first electric vehicle is to achieve at least a minimum state of charge.

6. The method of claim 1, wherein automatically matching the first charging task to the first electric vehicle further includes performing a mixed integer program.

7. The method of claim 6, wherein automatically matching the first charging task to the first electric vehicle further includes performing a convex relaxation of the mixed integer program.

8. The method of claim 6, wherein automatically matching the first charging task to the first electric vehicle further includes performing the mixed integer program including one or more of a job change penalty term or a station change penalty term.

9. The method of claim 6, wherein automatically matching the first charging task to the first electric vehicle further includes performing the mixed integer program including a non-assignment penalty term.

10. The method of claim 6, wherein automatically matching the first charging task to the first electric vehicle further includes performing the mixed integer program including a non-completion penalty term.

11. The method of claim 1, wherein allocating the first charging power to the automatically matched first charging station further includes automatically matching a charging trajectory including of one or more charging rates over time to the automatically matched first charging station based on:

the one or more first operation targets of the first charging task automatically matched to the first electric vehicle;

a maximum charge rate of the first electric vehicle; and a maximum power output of the automatically matched first charging station.

12. The method of claim 11, wherein automatically matching the charging trajectory further includes performing load management between the plurality of charging stations to stay below an electrical limit of the charging site or to reduce operating costs or emissions of the charging site.

13. A processing system, comprising:

a memory comprising computer-executable instructions; and a processor configured to execute the computer-executable instructions and cause the processing system to:

determine, via one or more sensors, that a first electric vehicle is in route to a charging site including a plurality of charging stations comprising a plurality of low-level charging stations and a plurality of high-level charging stations;

automatically match, based on a machine learning-based assignment, a first charging task to the first electric vehicle;

automatically match the first electric vehicle to a first charging station of the plurality of low-level charging stations based on:

one or more first operation targets of the first charging task being achievable by a low-level charging station; and determining that there is not a sufficient amount of power available at the charging site to charge the first electric vehicle with a high-level charging station concurrently as charging a second electric vehicle with another high-level charging station;

automatically match the second electric vehicle to a second charging station of the plurality of high-level charging stations based on:

one or more second operation targets of a second charging task associated with the second electric vehicle not being achievable by a low-level charging station;

in response to determining that the first electric vehicle has plugged into the automatically matched first charging station, associate the first electric vehicle with a first charging session;

in response to determining that the second electric vehicle has plugged into the automatically matched second charging station, associate the second electric vehicle with a second charging session;

determine an allocation of power among the plurality of charging stations for an electric vehicle fleet management at the charging site, the allocation of power based on at least one of the one or more first operation targets or the one or more second operation targets; and allocate, based on the determined allocation of power, first charging power to the automatically matched first charging station and second charging power to the automatically matched second charging station.

14. The processing system of claim 13, wherein the processor is further configured to cause the processing system to match an occupying vehicle to a different charging station of the plurality of charging stations and to issue instructions to cause the occupying vehicle to move, when the automatically matched first charging station is occupied by the occupying vehicle.

15. The processing system of claim 13, wherein the one or more first operation targets of the first charging task include a minimum state of charge for the first electric vehicle and a deadline by which the first electric vehicle is to achieve at least the minimum state of charge.

16. The processing system of claim 13, wherein to cause the processing system to automatically match the first charging task to the first electric vehicle, the processor is further configured to cause the processing system to:

select the first charging task from a list of charging tasks sorted by one of the one or more first operation targets of the first charging task.

17. The processing system of claim 13, wherein to cause the processing system to allocate the first charging power to the automatically matched first charging station, the processor is further configured to cause the processing system to automatically match a charging trajectory including of one or more charging rates over time to the automatically matched first charging station based on:

the one or more first operation targets of the first charging task automatically matched to the first electric vehicle;

a maximum charge rate of the first electric vehicle; and a maximum power output of the automatically matched first charging station.

18. A non-transitory computer-readable medium comprising computer-executable instructions that, when executed by a processor of a processing system, cause the processing system to:

determine, via one or more sensors, that a first electric vehicle is in route to a charging site including a plurality of charging stations comprising a plurality of low-level charging stations and a plurality of high-level charging stations;

automatically match, based on a machine learning-based assignment, a first charging task to the first electric vehicle;

automatically match the first electric vehicle to a first charging station of the plurality of low-level charging stations based on:

one or more first operation targets of the first charging task being achievable by a low-level charging station; and determining that there is not a sufficient amount of power available at the charging site to charge the first electric vehicle with a high-level charging station concurrently as charging a second electric vehicle with another high-level charging station;

automatically match the second electric vehicle to a second charging station of the plurality of high-level charging stations based on:

one or more second operation targets of a second charging task associated with the second electric vehicle not being achievable by a low-level charging station;

in response to determining that the first electric vehicle has plugged into the automatically matched first charging station, associate the first electric vehicle with a first charging session;

in response to determining that the second electric vehicle has plugged into the automatically matched second charging station, associate the second electric vehicle with a second charging session;

determine an allocation of power among the plurality of charging stations for an electric vehicle fleet management at the charging site, the allocation of power based on at least one of the one or more first operation targets or the one or more second operation targets; and allocate, based on the determined allocation of power, first charging power to the automatically matched first charging station and second charging power to the automatically matched second charging station.

19. The non-transitory computer-readable medium of claim 18, wherein the computer-executable instructions further cause the processing system to match an occupying vehicle to a different charging station of the plurality of charging stations and to issue instructions to cause the occupying vehicle to move, when the automatically matched first charging station is occupied by the occupying vehicle.

* * * * *